US012118601B2

(12) United States Patent
Luo et al.

(10) Patent No.: US 12,118,601 B2
(45) Date of Patent: Oct. 15, 2024

(54) METHOD, SYSTEM, AND NON-TRANSITORY COMPUTER-READABLE MEDIUM FOR ANALYZING FACIAL FEATURES FOR AUGMENTED REALITY EXPERIENCES OF PHYSICAL PRODUCTS IN A MESSAGING SYSTEM

(71) Applicant: Snap Inc., Santa Monica, CA (US)

(72) Inventors: Jean Luo, Los Angeles, CA (US); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/205,837

(22) Filed: Mar. 18, 2021

(65) Prior Publication Data
US 2021/0312523 A1    Oct. 7, 2021

Related U.S. Application Data

(60) Provisional application No. 63/003,442, filed on Apr. 1, 2020.

(51) Int. Cl.
G06Q 30/0601    (2023.01)
G06N 3/08    (2023.01)
(Continued)

(52) U.S. Cl.
CPC .......... G06Q 30/0631 (2013.01); G06N 3/08 (2013.01); G06Q 30/0621 (2013.01);
(Continued)

(58) Field of Classification Search
USPC ................................................ 705/26.1–27.2
See application file for complete search history.

(56) References Cited

U.S. PATENT DOCUMENTS 7,962,634 B2    6/2011    Cortos et al.
10,552,477 B2    2/2020    Ghatare et al.
(Continued)

FOREIGN PATENT DOCUMENTS

CN    115668263 A    1/2023
EP    3098771 A1    11/2016
(Continued)

OTHER PUBLICATIONS

Total Immersion Launches 1st Augmented Reality M-Commerce App. (Mar. 1, 2011). AsiaPulse News Retrieved from https://dialog.proquest.com/professional/docview/854484301?accountid=131444 (Year: 2011).*

(Continued)

*Primary Examiner* — Jeffrey A. Smith
*Assistant Examiner* — Ashley D Preston
(74) *Attorney, Agent, or Firm* — Schwegman Lundberg & Woessner, P.A.

(57) ABSTRACT

The subject technology receives image data including a representation of a face of a user. The subject technology analyzes the image data to determine a set of characteristics of the representation of the face. The subject technology, based at least in part on the determined set of characteristics, selects a particular product and a set of media content associated with the particular product. The subject technology causes display, at a client device, at least one recommendation corresponding to the set of media content associated with the particular product.

20 Claims, 25 Drawing Sheets

(51) Int. Cl.
    *G06V 10/56*     (2022.01)
    *G06V 10/764*     (2022.01)
    *G06V 10/82*     (2022.01)
    *G06V 20/20*     (2022.01)
    *G06V 40/16*     (2022.01)

(52) U.S. Cl.
    CPC ......... *G06Q 30/0643* (2013.01); *G06V 10/56* (2022.01); *G06V 10/764* (2022.01); *G06V 10/82* (2022.01); *G06V 20/20* (2022.01); *G06V 40/165* (2022.01); *G06V 40/169* (2022.01); *G06V 40/171* (2022.01)

(56) References Cited

U.S. PATENT DOCUMENTS

| | | |
|---|---|---|
| 10,698,706 B1 | 6/2020 | Rabe et al. |
| 10,755,061 B1 | 8/2020 | Monroy-Hernández |
| 11,055,759 B1 | 7/2021 | Natesh et al. |
| 11,069,094 B1 | 7/2021 | Evangelista et al. |
| 11,521,334 B2 | 12/2022 | Luo et al. |
| 11,915,305 B2 | 2/2024 | Luo et al. |
| 11,922,661 B2 | 3/2024 | Luo et al. |
| 2008/0005746 A1 | 1/2008 | Jianzhong et al. |
| 2012/0099756 A1 | 4/2012 | Sherman et al. |
| 2013/0325779 A1 | 12/2013 | Shahshahani et al. |
| 2014/0379729 A1 | 12/2014 | Savage et al. |
| 2015/0178705 A1 | 6/2015 | Vodopia |
| 2016/0283998 A1 | 9/2016 | Pathak |
| 2016/0342863 A1 | 11/2016 | Kwon et al. |
| 2017/0068986 A1 | 3/2017 | Chan et al. |
| 2018/0055736 A1 | 3/2018 | Hasegawa |
| 2018/0075523 A1 | 3/2018 | Sartori Odizzio et al. |
| 2018/0084306 A1 | 3/2018 | Hunter |
| 2018/0268458 A1* | 9/2018 | Popa ............... G06Q 30/02 |
| 2019/0014884 A1* | 1/2019 | Fu ............... G06V 20/20 |
| 2019/0016257 A1 | 1/2019 | Sakata et al. |
| 2019/0023281 A1 | 1/2019 | Fukutaka et al. |
| 2019/0114061 A1 | 4/2019 | Daniels et al. |
| 2019/0122063 A1 | 4/2019 | Kim et al. |
| 2019/0179405 A1* | 6/2019 | Sun ............... G06F 1/1686 |
| 2019/0182369 A1 | 6/2019 | Gauvin et al. |
| 2019/0215574 A1 | 7/2019 | Saxena et al. |
| 2019/0266661 A1 | 8/2019 | De Sousa Moura et al. |
| 2019/0325498 A1 | 10/2019 | Clark |
| 2020/0250714 A1* | 8/2020 | Wang ............... G06Q 30/0627 |
| 2020/0302693 A1* | 9/2020 | Singh ............... G06Q 30/0643 |
| 2020/0305579 A1* | 10/2020 | Yang ............... G06T 19/006 |
| 2020/0357178 A1 | 11/2020 | Lin |
| 2021/0015241 A1* | 1/2021 | Kuang ............... G06Q 30/0282 |
| 2021/0224889 A1 | 7/2021 | Colby et al. |
| 2021/0312533 A1 | 10/2021 | Luo et al. |
| 2021/0312672 A1 | 10/2021 | Luo et al. |
| 2021/0312678 A1 | 10/2021 | Luo et al. |
| 2021/0383460 A1 | 12/2021 | Sartori Odizzio et al. |
| 2022/0148161 A1* | 5/2022 | Guo ............... A61B 5/7435 |
| 2022/0351416 A1 | 11/2022 | Zhang et al. |
| 2023/0071930 A1 | 3/2023 | Luo et al. |
| 2024/0161179 A1 | 5/2024 | Luo et al. |
| 2024/0185460 A1 | 6/2024 | Luo et al. |

FOREIGN PATENT DOCUMENTS

| | | |
|---|---|---|
| KR | 20180025754 A | 3/2018 |
| KR | 101866859 B1 | 6/2018 |
| KR | 102668172 | 5/2024 |
| WO | WO-2009120921 A1 | 10/2009 |
| WO | 2010120901 | 10/2010 |
| WO | WO-2019140091 A1 | 7/2019 |
| WO | 2021203118 | 10/2021 |

OTHER PUBLICATIONS

"International Application Serial No. PCT/US2021/070284, International Search Report mailed Aug. 23, 2021", 5 pgs.

"International Application Serial No. PCT/US2021/070284, Written Opinion mailed Aug. 23, 2021", 5 pgs.

"U.S. Appl. No. 17/205,891, Non Final Office Action mailed Feb. 17, 2022", 11 pgs.

"U.S. Appl. No. 17/249,927, Non Final Office Action mailed Apr. 12, 2022", 15 pgs.

"International Application Serial No. PCT/US2021/070284, Invitation to Pay Additional Fees mailed Jun. 30, 2021", 11 pgs.

"U.S. Appl. No. 17/205,891, Notice of Allowance mailed Jul. 19, 2022", 10 pgs.

"U.S. Appl. No. 17/205,891, Response filed May 17, 2022 to Non Final Office Action mailed Feb. 17, 2022", 11 pgs.

"U.S. Appl. No. 17/249,927, Response filed Jul. 11, 2022 to Non Final Office Action mailed Apr. 12, 2022", 13 pgs.

"U.S. Appl. No. 17/205,891, Notice of Allowability mailed Oct. 31, 2022", 2 pgs.

"U.S. Appl. No. 17/249,923, Final Office Action mailed Mar. 2, 2023", 24 pgs.

"U.S. Appl. No. 17/249,923, Non Final Office Action mailed Nov. 3, 2022", 23 pgs.

"U.S. Appl. No. 17/249,923, Response filed Feb. 3, 2023 to Non Final Office Action mailed Nov. 3, 2022", 15 pgs.

"U.S. Appl. No. 17/249,927, Final Office Action mailed Sep. 29, 2022", 20 pgs.

"U.S. Appl. No. 17/249,927, Non Final Office Action mailed Feb. 23, 2023", 21 pgs.

"U.S. Appl. No. 17/249,927, Response filed Dec. 29, 2022 to Final Office Action mailed Sep. 29, 2022", 14 pgs.

EBay (eBAY) issued patent titled "Identifying product metadata from an item image", Publication: News Bites—Computing & Information [Melbourne], (Feb. 7, 2020).

"International Application Serial No. PCT/US2021/070284, International Preliminary Report on Patentability mailed Oct. 13, 2022", 11 pgs.

Global Cosmetic Industry164.3: 8(1). Allured Publishing Corp., [Online] Retrieved from the internet: <Drugstore.com>, (Mar. 1999).

"U.S. Appl. No. 17/249,923, Non Final Office Action mailed Jun. 15, 2023", 27 pgs.

"U.S. Appl. No. 17/249,923, Response filed Jun. 2, 2023 to Final Office Action mailed Mar. 2, 2023", 17 pgs.

"U.S. Appl. No. 17/249,927, Response filed May 23, 2023 to Non Final Office Action mailed Feb. 23, 2023", 14 pgs.

"U.S. Appl. No. 18/056,060, Non Final Office Action mailed May 25, 2023", 18 pgs.

"U.S. Appl. No. 17/249,923, Notice of Allowance mailed Oct. 17, 2023", 11 pgs.

"U.S. Appl. No. 17/249,923, Response filed Sep. 15, 2023 to Non Final Office Action mailed Jun. 15, 2023", 22 pgs.

"U.S. Appl. No. 17/249,927, Final Office Action mailed Aug. 10, 2023", 24 pgs.

"U.S. Appl. No. 18/056,060, Corrected Notice of Allowability mailed Nov. 6, 2023", 2 pgs.

"U.S. Appl. No. 18/056,060, Notice of Allowance mailed Oct. 20, 2023", 11 pgs.

"U.S. Appl. No. 18/056,060, Response filed Aug. 25, 2023 to Non Final Office Action mailed May 25, 2023", 10 pgs.

"U.S. Appl. No. 17/249,927, Non Final Office Action mailed Mar. 20, 2024", 24 pgs.

"U.S. Appl. No. 17/249,927, Response filed Feb. 9, 2024 to Final Office Action mailed Aug. 10, 2023", 13 pgs.

\* cited by examiner

METHOD, SYSTEM, AND NON-TRANSITORY COMPUTER-READABLE MEDIUM FOR ANALYZING FACIAL FEATURES FOR AUGMENTED REALITY EXPERIENCES OF PHYSICAL PRODUCTS IN A MESSAGING SYSTEM

PRIORITY CLAIM

This application claims the benefit of priority of U.S. Provisional Patent Application No. 63/003,442, filed Apr. 1, 2020, which is hereby incorporated by reference herein in its entirety for all purposes.

BACKGROUND

This application relates generally to, utilizing electronic devices, providing augmented reality experiences of physical products.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
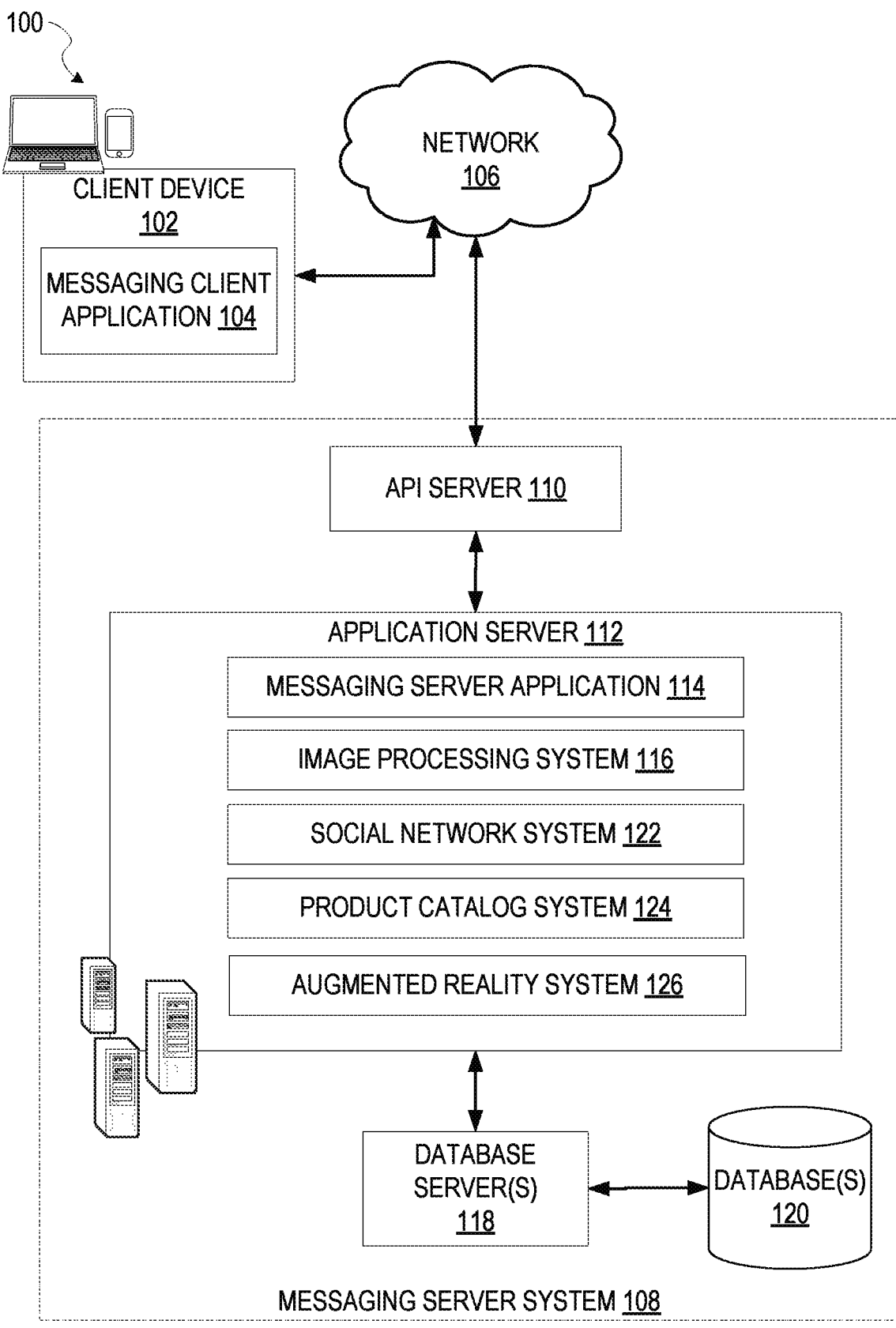
FIG. 1 is a diagrammatic representation of a networked environment in which the present disclosure may be deployed, in accordance with some example embodiments.

With the increased use of digital images, affordability of portable computing devices, availability of increased capacity of digital storage media, and increased bandwidth and accessibility of network connections, digital images have become a part of the daily life for an increasing number of people. Users with a range of interests from various locations can capture digital images of various subjects and make captured images available to others via networks, for example the Internet. For enhancing users' experiences with digital images and content using augmented reality, and enabling computing devices to identify various objects or features captured in a wide range of changing conditions (e.g., changes in image scales, noises, lighting, movement, or geometric distortion) can be challenging and computationally intensive. In an aspect, the subject technology provides an improved system for providing augmented reality experiences of products (which can be purchased) that are then applied to such objects (e.g., a user's face) as described further herein.

Messaging systems are frequently utilized, and are increasingly leveraged by users of mobile computing devices, in various settings, to provide different types of functionality in a convenient manner. As described herein, the subject messaging system provides a practical application that enables providing augmented reality experiences for products. The subject messaging system performs a process to access additional information related to a given product based on product metadata, while leveraging the capabilities of the subject message system. The subject messaging system can render an augmented reality (AR) experience(s), in connection with the product, in a scene with an object(s) such as a user's face, along with providing product information, or other information. In an example, the AR experience provides AR content that is applied to the object such as a representation of the user's face or other part of the user's body (e.g., arm, leg, and the like) for display on a given client device. Such AR content can be related to the product, such as rendering how a beauty product would appear on the representation of the user's face.

As also described herein, the subject messaging system provides a practical application that enables identification of physical items or products based on image data captured by a given client device (e.g., mobile computing device) and provided to the subject messaging system for analysis. In particular, a given user of the subject messaging system can capture an image or set of images of a physical item that includes a physical identification indicator, such as a barcode, that may identify the physical item. The subject messaging system extracts product metadata from the physical identification indicator, and performs a process to determine additional product metadata, while leveraging the capabilities of the subject message system. Thus, the subject technology is understood to advantageously provide technical improvements in presenting AR content items to facilitate a natural and intuitive presentation of AR content (e.g., without lag and dropping frames due to graphical bottlenecks and inefficient processing of AR content) and thereby increase a sense of presence in an environment including a mixture of (real) physical items and AR content items.

In an example, the technical improvements also involve utilizing server or remote computing resources to process and render AR content, while in yet another example, AR content can be rendered by a given computing device and then propagated to other computing devices for presentation. Through the combination and utilization of various techniques described herein, a latency of displaying AR content items (e.g., a duration of time(s) for the AR content to be generated and subsequently rendered on the respective display of a given device) can be reduced, in comparison with other existing implementations, to provide a more immersive and compelling user experience.

As referred to herein, the phrase "augmented reality experience," "augmented reality content item," "augmented reality content generator" includes or refers to various image processing operations corresponding to an image modification, filter, LENSES, media overlay, transformation, and the like, as described further herein.

FIG. 1 is a block diagram showing an example of a messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116, a social network system 122, a product catalog system 124, and an augmented reality system 126. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
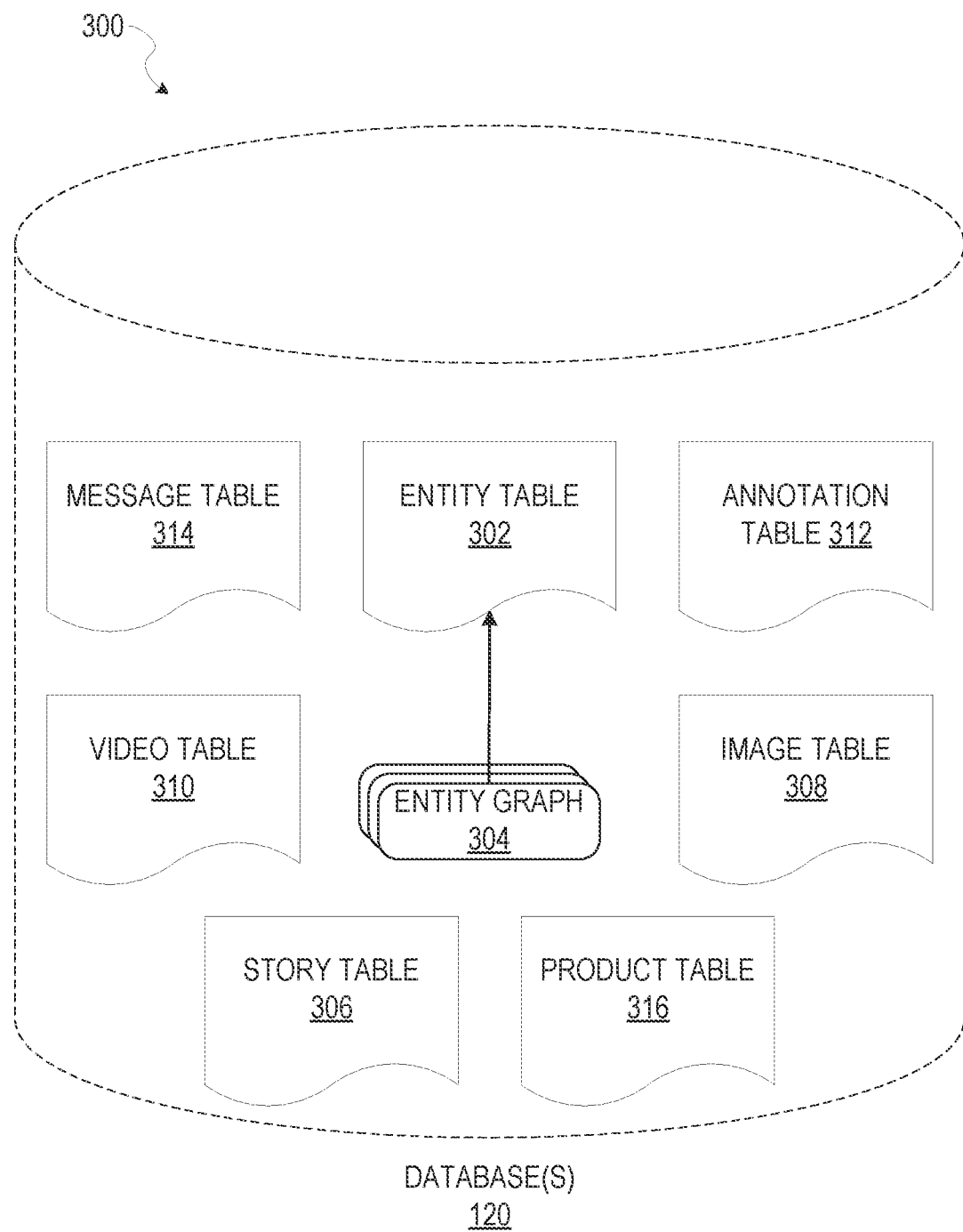
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The messaging client application 104 includes a set of functions that allows the client device 102 to access the augmented reality system 126. The augmented reality system 126 generates and maintains a list of augmented reality content generators. A given augmented reality content generator may correspond to an augmented reality content item (or some other image modification, image processing, transformation, modification, and the like) for supplementing captured image data or video data with augmented reality content in order to provide an augmented reality experience(s).

In one or more embodiments, the augmented reality system 126 identifies an object depicted in the one or more images captured by the messaging client application 104, and determines one or more attributes of the object. The augmented reality system 126 searches for one or more augmented reality content items (e.g., virtual objects) that are associated with the one or more attributes of the object, and ranks the virtual objects (e.g., based on the associations and weights assigned to each of the attributes). The augmented reality system 126 causes one or more virtual objects or graphical elements of the highest ranked augmented reality content item to be presented on top of the captured image.

The application server 112 is communicatively coupled to a database server 118, which facilitates access to a database 120 in which is stored data associated with messages processed by the messaging server application 114.

The product catalog system 124 performs operations for verifying products based at least on image data of such products provided by the messaging client application 104. In an embodiment, the product catalog system 124 may store information (e.g., metadata) related to manufacturers of such products, and information utilized for verifying the authenticity of the products, in the database 120. The product catalog system 124 is discussed in further detail with respect to FIG. 6 below.

Figure 2:
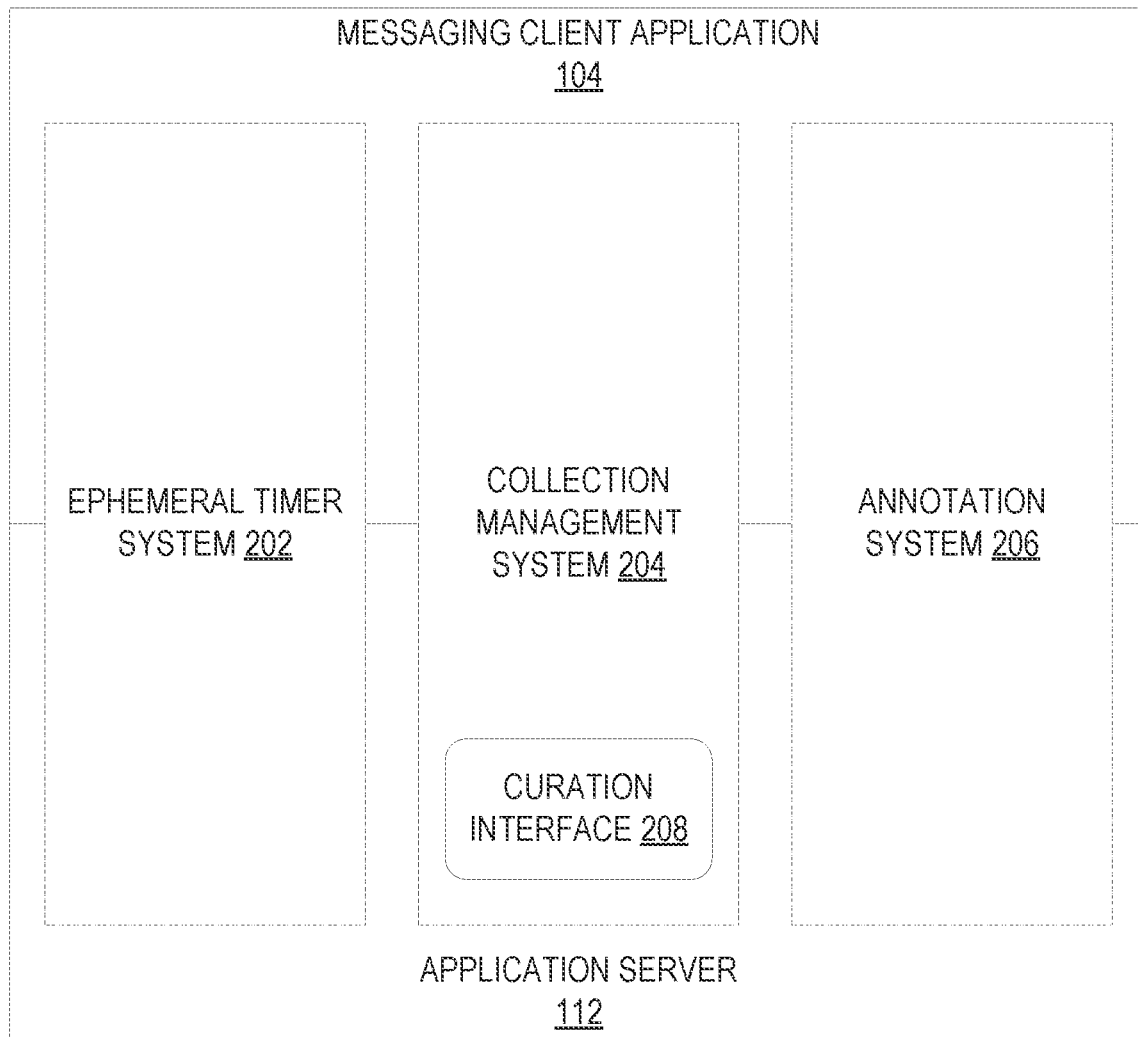
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 are augmented reality content generators (e.g., corresponding to applying LENSES, augmented reality experiences, or augmented reality content items). An augmented reality content generator may be a real-time special effect and sound that may be added to an image or a video.

As described above, augmented reality content generators, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content generators, a user can use a single video clip with multiple augmented reality content generators to see how the different augmented reality content generators will modify the stored clip. For example, multiple augmented reality content generators that apply different pseudorandom movement models can be applied to the same content by selecting different augmented reality content generators for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content generators will look within different windows in a display at the same time. This can, for example, enable multiple windows with different pseudorandom animations to be viewed on a display at the same time.

Data and various systems using augmented reality content generators or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content generators thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

In some example embodiments, a graphical processing pipeline architecture is provided that enables different augmented reality experiences (e.g., AR content generators) to be applied in corresponding different layers. Such a graphical processing pipeline provides an extensible rendering engine for providing multiple augmented reality experiences that are included in a composite media (e.g., image or video) for rendering by the messaging client application 104 (or the messaging system 100).

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

The database 120 also stores data of products in a product table 316, which enables the product catalog system 124 to perform operations related to providing an augmented reality experience with respect to a product (e.g., a given physical item that may be available for purchase or sale). In an example, the product table 316 includes a directory (e.g., listing) of products and their associated product identifiers, which can be compared against product metadata provided by the product catalog system 124. As described further herein, the product catalog system 124 can determine product metadata associated with a particular product. Such product metadata, as described further below, include a product identifier, which can be utilized as part of a process for providing an augmented reality experience in connection with the product.

Figure 4:
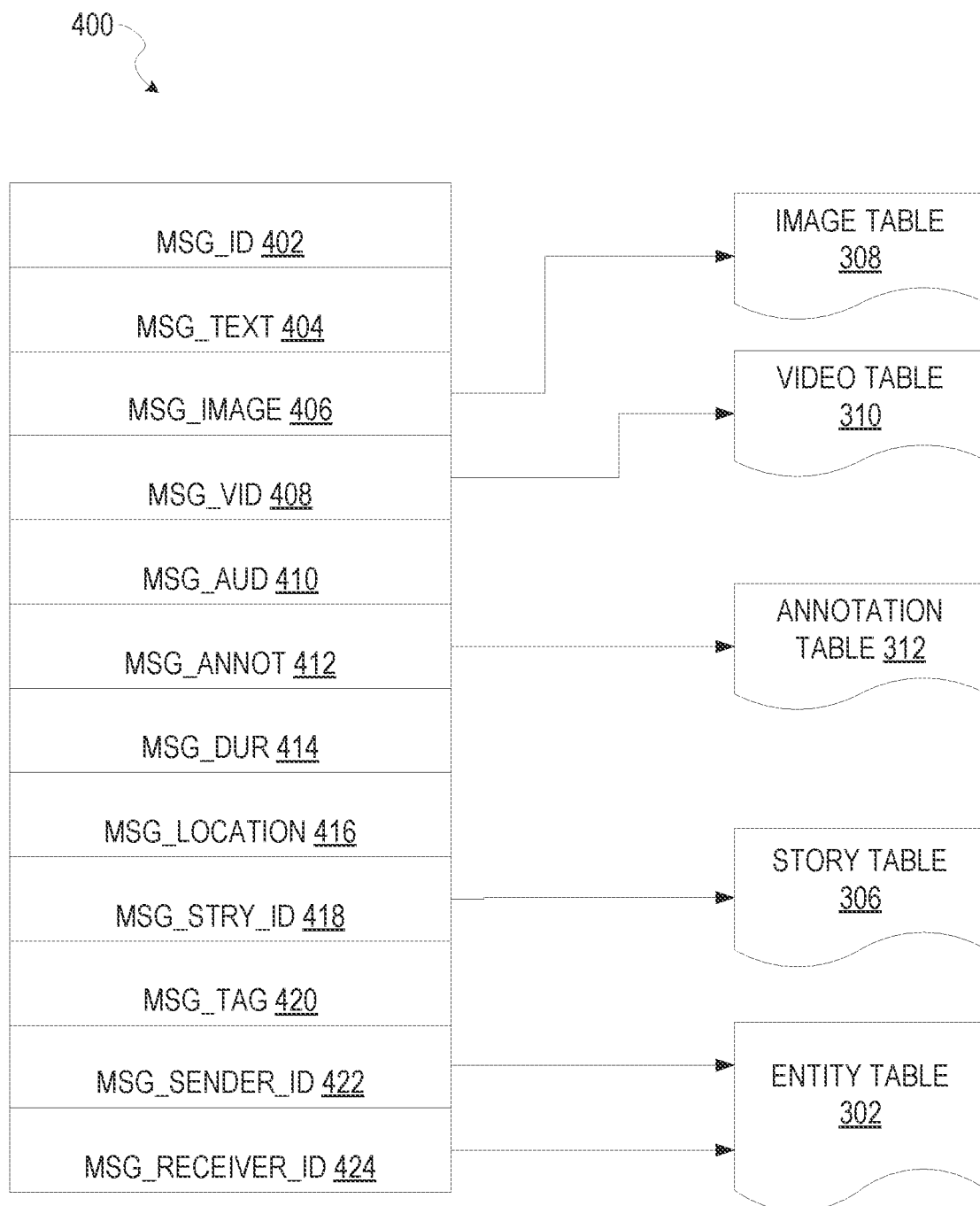
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
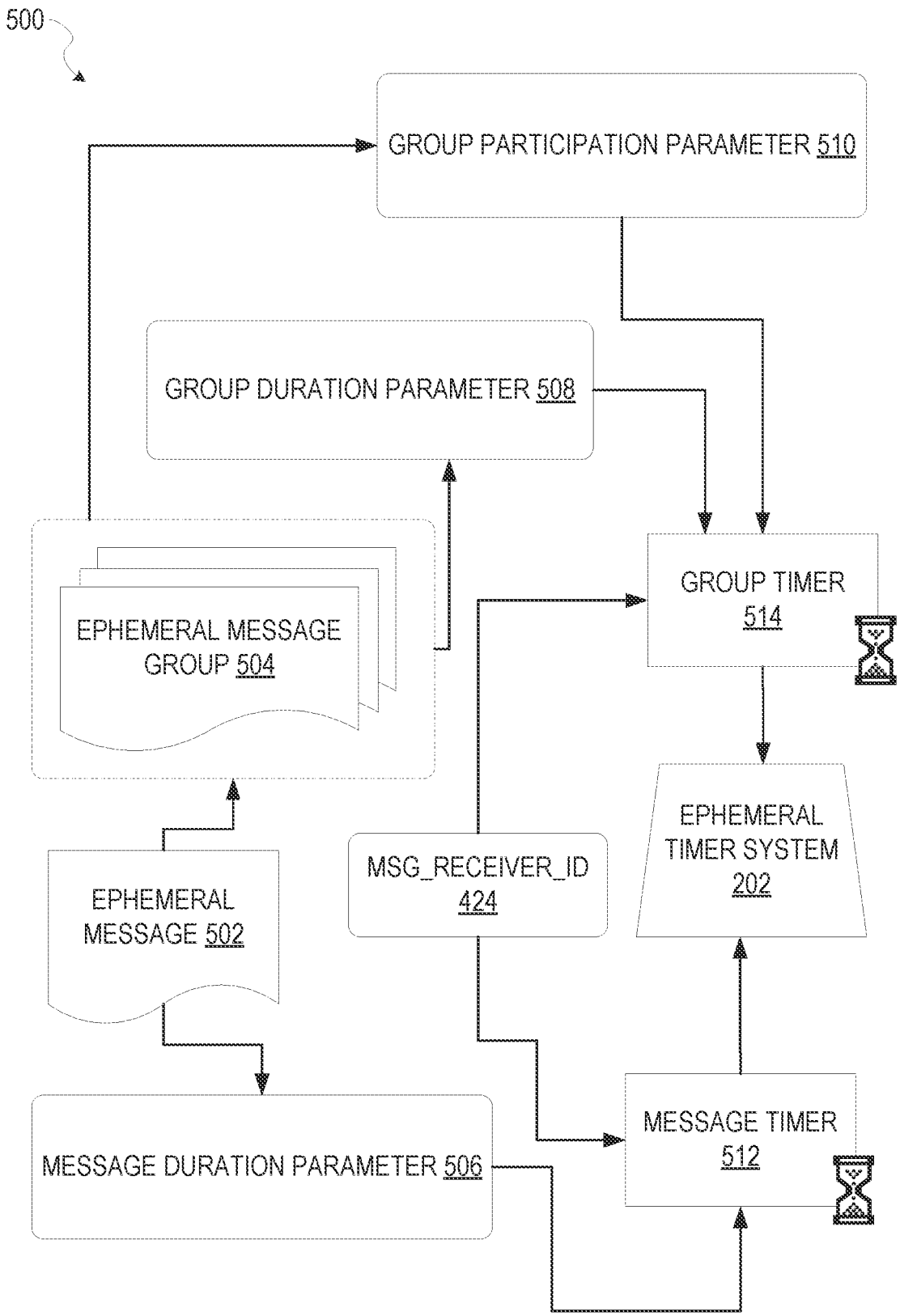
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized implementation of the ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
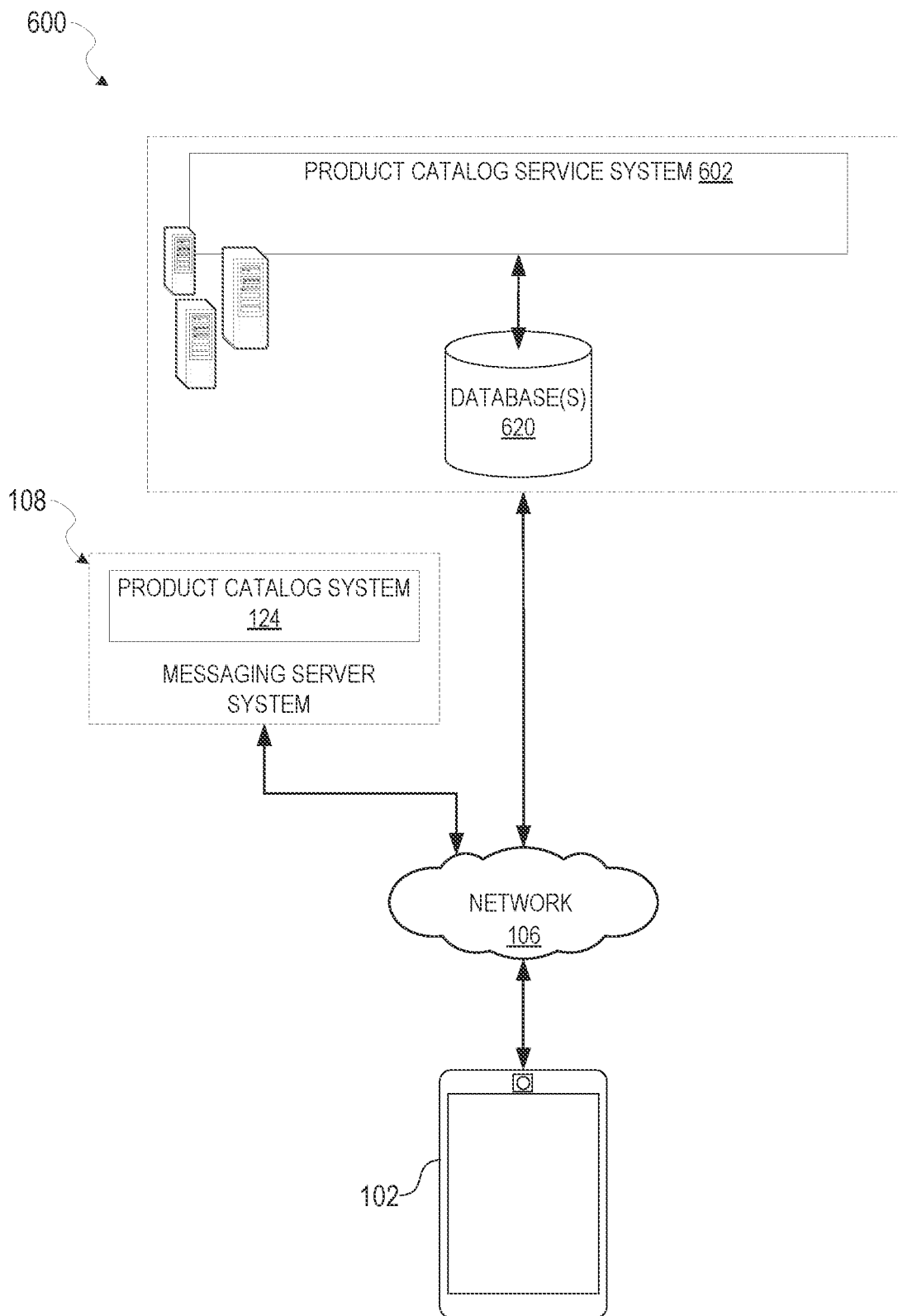
FIG. 6 is a block diagram showing an example network environment for accessing a product catalog service for products (e.g., physical items), including portions of the messaging system discussed above in FIG. 1, according to some example embodiments.

FIG. 6 is a block diagram showing an example network environment 600 for accessing information from a product catalog service for products (e.g., physical items for sale), including portions of the messaging system 100 discussed above in FIG. 1, according to some example embodiments. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

For explanatory purposes, the network environment 600 is illustrated in FIG. 6 as including the client device 102, the messaging server system 108, and a product catalog service system 602; however, the network environment 600 may include any number of electronic devices and any number of servers or a data center including multiple servers in some embodiments.

In one or more implementations, the network 106 may be an interconnected network of electronic devices that may include, or may be communicatively coupled to, the Internet. The network 106 may communicatively (directly or indirectly) couple, for example, the client device 102 with the messaging server system 108 or the product catalog service system 602.

The messaging server system 108 or the product catalog service system 602 may be part of a network of computers or a group of servers, such as in a cloud computing or data center implementation. The messaging server system 108 or the product catalog service system 602 store or generate information that are requested or received by the client device 102 as described further below.

As illustrated, the client device 102, which hosts a number of applications including the messaging client application 104 as described before in FIG. 1, is communicatively coupled to other instances of the messaging client application 104 (e.g., on another client device 102), and the messaging server system 108 via the network 106. The messaging server system 108 includes the product catalog system 124 as described above in FIG. 1.

In an example embodiment, the client device 102 may select or access an augmented reality (AR) experience, such as an augmented reality (AR) content generator, and the like for a given product, by using the product catalog system 124. The product catalog system 124 may access a product catalog service system 602, which provides product information/metadata in one or more databases 620 regarding respective products.

The product catalog system 124 can receive at least an indicator of a selected AR experience (e.g., a product AR experience ID as described further herein) from the client device 102, and perform a lookup, search, or select operation on the product table 316 to retrieve the product metadata from the database 120. In an example embodiment, such product metadata includes a product identifier (ID). The product catalog system 124 provides the client device 102 with the aforementioned product metadata, which enables the client device 102 to access or initiate the selected AR experience for display on the client device 102.

In an example embodiment, the client device 102 may provide image data including a representation of a physical item (e.g., captured using a camera provided by the client device 102) including an identification indicator (e.g., a physical barcode, etc.) of the physical item, and analyze the image data to extract information (e.g., verification metadata from the barcode) from the identification indicator. The extracted information may include a manufacturer identifier (ID), a product ID, or an item unique ID (e.g., unique serial number, etc.).

The product catalog system 124 can receive the aforementioned extracted information from the client device 102, and determine additional product information (e.g., product metadata). Additional product metadata of a given physical item may be determined based at least in part on a set of signals (e.g., provided by the client device 102 or the product catalog system 124) including information that respective manufacturers have maintained regarding individual products including, but not limited to, barcodes, Universal Product Code (UPC) codes, QR codes, Snapcodes™, unique individual serial numbers, stock keeping unit numbers, vehicle identification numbers, European article numbers (EAN), international standard book numbers (ISBN), manufacturer part numbers (MPN), global trade item number (GTIN), Japanese article numbers (JAN), watermarks, and the like. Other signals that may be utilized can include location information (e.g., GPS coordinates to determine a particular reseller or retail, or geographic region corresponding to the physical item), network information (e.g., Wi-Fi network), etc. Further, it is appreciated that the physical item can include a respective physical identification indicator(s) based on one or more of the aforementioned standards or formats for identifying individual products.

The product catalog system 124 can receive at least the product ID from the client device 102 (or the product catalog system 124 as discussed below), and perform a lookup, search, or select operation on the product table 316 to retrieve the product metadata from the database 120. The product catalog system 124 then provides the client device 102 or the product catalog system 124 with the aforementioned product metadata.

For purposes of populating the product table 316, the product catalog system 124 can communicate with the product catalog service system 602. In an example, the product catalog system 124 can send a request message to a respective server for obtaining metadata related to a given physical item. The request message may include, for example, the product ID. In an embodiment, such a server is, as further illustrated in the network environment 600, the product catalog service system 602. The product catalog service system 602, in an embodiment, is implemented as an electronic-based service (e.g., web service) that can be accessed by a given client electronic device, such as the client device 102, based on a request message including the product ID in a particular message protocol. In response to the request message, the product catalog service system 602 can perform a search or database query, based on the included product ID in the request message, for information or metadata related to the physical item.

In response to the request message, the product catalog service system 602 can provide a response message to the product catalog system 124, which includes, in an example embodiment, the information from the database 620 in response to the request. The product catalog system 124 can store the received information into the database 120. Based at least on information retrieved from the database 120 related to the product, the client device 102 can provide for display (e.g., rendering on a UI of the messaging client application 104) an AR experience for the product.

In an embodiment, the client device 102 as described above in FIG. 6 may be, for example, a portable computing device such as a laptop computer, a smartphone, a peripheral device (e.g., a digital camera), a tablet device, a wearable device such as a watch, a band, a headset, and the like, or any other appropriate device. Each of the aforementioned device may also support touchscreen gestures (e.g., through use of a touchscreen) or non-touch gestures (e.g., through use of a gyroscope or motion sensor). In one or more implementations, the client device 102 may support touchscreen-like gestures, such as in a virtual reality or augmented reality environment. In FIG. 6, by way of example, the client device 102 is depicted as a mobile electronic device with a touchscreen. In one or more implementations, the client device 102 may be, or may include all or part of, a machine as described further below. The client device 102 may include components that perform operations for providing AR experiences of physical items (e.g., products) as described in further detail below.

In an embodiment, the client device 102 is a head mounted portable system, wearable by a user, that includes a system capable of capturing images, audio, videos, multimedia content, and the like, based on a user's surrounding physical environment.

As described further herein, the client device 102 can perform a set of image, text, or object recognition processes to extract product metadata from captured image data in which the image data can include a representation of a physical item corresponding to a product and a physical identification indicator (e.g., a barcode) corresponding to the physical item.

As discussed before, the client device 102 may provide image data including a representation of a physical item (e.g., captured using a camera provided by the client device 102) including an identification indicator (e.g., a physical barcode, etc.) of the physical item, and analyze the image data to extract information (e.g., product metadata from the barcode) from the identification indicator. The extracted information may include a manufacturer identifier (ID), a product ID, or an item unique ID (e.g., unique serial number, etc.), and the like.

Figure 7:
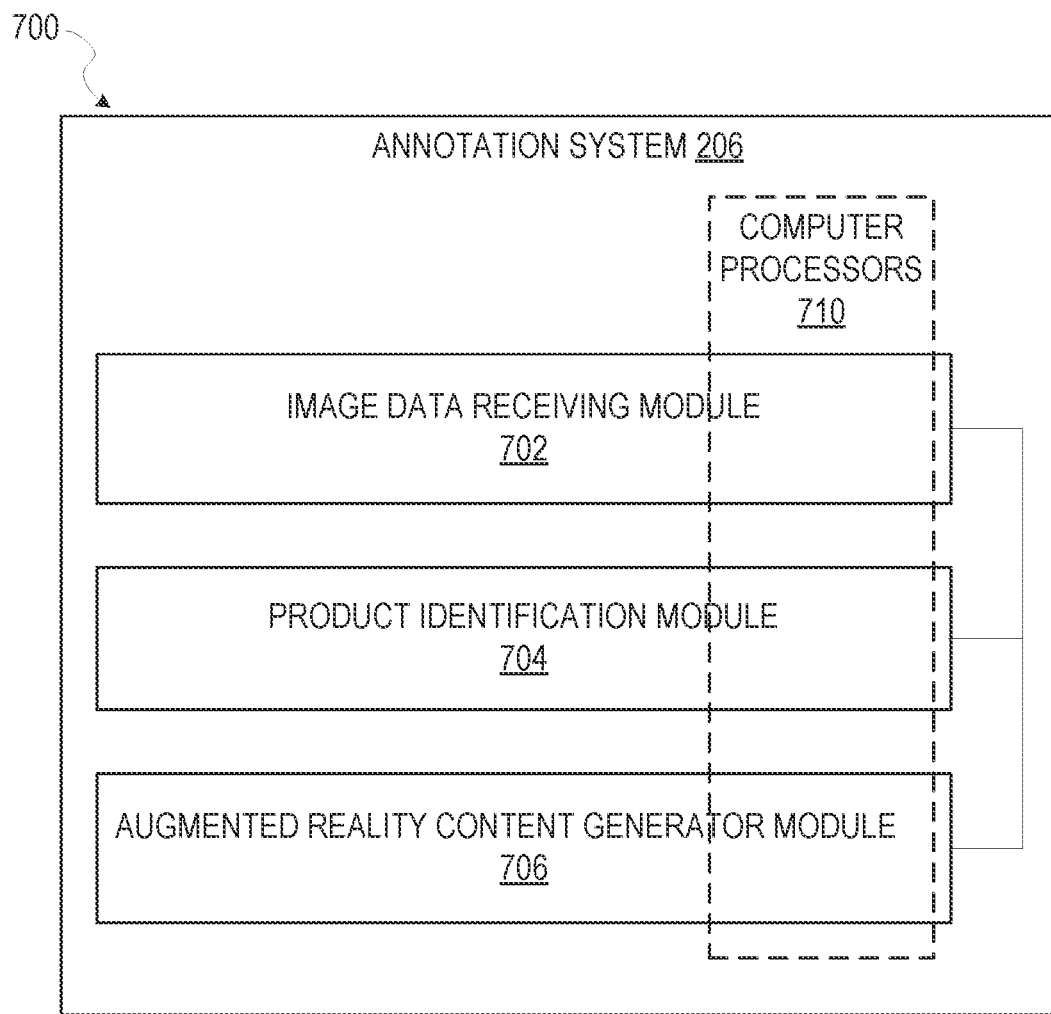
FIG. 7 is a block diagram illustrating various modules of an annotation system, according to certain example embodiments.

FIG. 7 is a block diagram 700 illustrating various modules of an annotation system 206, according to certain example embodiments. The annotation system 206 is shown as including an image data receiving module 702, a product identification module 704, and a augmented reality content generator module 706. The various modules of the annotation system 206 are configured to communicate with each other (e.g., via a bus, shared memory, or a switch). Any one or more of these modules may be implemented using one or more computer processors 710 (e.g., by configuring such one or more computer processors to perform functions described for that module) and hence may include one or more of the computer processors 710 (e.g., a set of processors provided by the client device 102).

Any one or more of the modules described may be implemented using hardware alone (e.g., one or more of the computer processors 710 of a machine (e.g., machine 2500) or a combination of hardware and software. For example, any described module of the annotation system 206 may physically include an arrangement of one or more of the computer processors 710 (e.g., a subset of or among the one or more computer processors of the machine (e.g., machine 2500) configured to perform the operations described herein for that module. As another example, any module of the annotation system 206 may include software, hardware, or both, that configure an arrangement of one or more computer processors 710 (e.g., among the one or more computer processors of the machine (e.g., machine 2500) to perform the operations described herein for that module. Accordingly, different modules of the annotation system 206 may include and configure different arrangements of such computer processors 710 or a single arrangement of such computer processors 710 at different points in time. Moreover, any two or more modules of the annotation system 206 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The image data receiving module 702 receives images captured by a client device 102. For example, an image is a photograph captured by an optical sensor (e.g., camera) of the client device 102. An image includes one or more real-world features, such a user's face, or a physical object(s) detected in the image. In some embodiments, an image includes metadata describing the image.

The product identification module 704 utilizes different object detection processes to detect objects in the image, such as a physical item corresponding to a product that a user wants to extract product metadata from, or a physical indicator of identification (e.g., barcode) corresponding to the physical item. In an example, imaging processing algorithms and recognition techniques may be used to detect objects of the image. For example, optical character recognition (OCR) can be used as a primary image analysis technique or to enhance other processes. Features (e.g., shape, size, color and text) of the image can be extracted. In some embodiments, image processing processes may include sub-processes such as, for example, thresholding (converting a grayscale image to black and white, or using separation based on a grayscale value), segmentation, blob extraction, pattern recognition, barcode and data matrix code reading, gauging (measuring object dimensions), positioning, edge detection, color analysis, filtering (e.g. morphological filtering) and template matching (finding, matching, or counting specific patterns).

Further, the product identification module 704, in an example embodiment, utilizes a set of classifiers that classify an image received from a camera of a mobile computing device into one or more classes. In an embodiment, an example set of image classifier determines whether the image includes a physical identification indicator containing text, barcode pattern(s), or QR code pattern(s), and the like. In an embodiment, another example set of image classifiers performs object classification based on a library of 3D models or images (e.g., stored in database 120). Various techniques (e.g., OCR and other geometric recognition processes) may also be used as the image analysis technique to recognize one or more potential objects of the image (e.g., the physical item corresponding to the product, and the physical identification indicator of the physical item). Further, it is appreciated that the product identification module 704 may utilize machine learning models (e.g., prediction model to classify image data into a particular object classification or type) to perform object recognition.

The product identification module 704 can perform operations (e.g., a process) for extracting product metadata from a recognized object corresponding to a physical identification indicator of the physical item in the image, and determining additional product metadata for the physical item. Further, the product identification module 704 may receive additional product metadata from the product catalog system 124 as described herein.

The augmented reality content generator module 706 cause display of selectable graphical items that, in an embodiment, are presented in a carousel arrangement (e.g., a carousel interface). By way of example, the user can utilize various inputs to rotate the selectable graphical items onto and off of the display screen in manner corresponding to a carousel providing a cyclic view of the graphical items. The carousel arrangement allows multiple graphical items to occupy a particular graphical area on the display screen. In an example, respective AR experiences corresponding to different AR content generators can be organized into respective groups for including on the carousel arrangement thereby enabling rotating through media overlays by group. Although a carousel interface is provided as an example, it is appreciated that other graphical interfaces may be utilized. For example, a set of augmented reality content generators can include graphical list, scroll list, scroll graphic, or another graphical interface that enables navigation through various graphical items for selection, and the like. As used herein a carousel interface refers to display of graphical items in an arrangement similar to a circular list, thereby enabling navigation, based on user inputs (e.g., touch or gestures), through the circular list to select or scroll through the graphical items. In an example, a set of graphical items may be presented on a horizontal (or vertical) line or axis where each graphical item is represented as a particular thumbnail image (or icon, avatar, and the like). At any one time, some of the graphical items in the carousel interface may be hidden. If the user wants to view the hidden graphical items, in an example, the user may provide a user input (e.g., touch, gesture, and the like) to scroll through the graphical items in a particular direction (e.g., left, right, up, or down, and the like). Afterward, a subsequent view of the carousel interface is displayed where an animation is provided or rendered to present one or more additional graphical items for inclusion on the interface, and where some of the previously presented graphical items may be hidden in this subsequent view. In an embodiment, in this manner the user can navigate through the set of graphical items back and forth in a circular fashion. Thus, it is appreciated that the carousel interface can optimize screen space by displaying only a subset of images from a set of graphical items in a cyclic view.

The augmented reality content generator module 706 utilizes different object or facial detection processes to detect objects or a face in the image. In an example, imaging processing algorithms and recognition techniques may be used to detect the user's face in the image. Based on the selected AR content generator, the augmented reality content generator module 706 can generate and render an AR experience based on the selected AR content generator from the carousel interface for display on a given client device (e.g., the client device 102). In an embodiment, information from the product identification module 704 (e.g., a product ID, and the like) is used by the augmented reality content generator module 706 to render such AR content.

The augmented reality content generator module 706 performs rendering of content for display by the messaging client application 104 based on data provided by at least one of the aforementioned modules. For example, the augmented reality content generator module 706 performs various operations based on algorithms or techniques that correspond to animations or providing visual or auditory effects, based on the product information, to the received image data, which is described further herein.

The augmented reality content generator module 706 performs rendering of the message for display by the messaging client application 104 based on data provided by at least one of the aforementioned modules. In an example, the augmented reality content generator module 706 utilizes a graphical processing pipeline to perform graphical operations to render the message for display. The augmented reality content generator module 706 implements, in an example, an extensible rendering engine which supports multiple image processing operations corresponding to respective media overlays.

In some implementations, the augmented reality content generator module 706 provide a graphics system that renders two-dimensional (2D) objects or objects from a three-dimensional (3D) world (real or imaginary) onto a 2D display screen. Such a graphics system (e.g., one included on the client device 102) includes a graphics processing unit (GPU) in some implementations for performing image processing operations and rendering graphical elements for display.

In an implementation, the GPU includes a logical graphical processing pipeline, which can receive a representation of a 2D or 3D scene and provide an output of a bitmap that represents a 2D image for display. Existing application programming interfaces (APIs) have implemented graphical pipeline models. Examples of such APIs include the Open Graphics Library (OPENGL) API and the METAL API. The graphical processing pipeline includes a number of stages to convert a group of vertices, textures, buffers, and state information into an image frame on the screen. In an implementation, one of the stages of the graphical processing pipeline is a shader, which may be utilized as part of a particular augmented reality content generator that is applied to an input frame (e.g., image or video). A shader can be implemented as code running on a specialized processing unit, also referred to as a shader unit or shader processor, usually executing several computing threads, programmed to generate appropriate levels of color or special effects to fragments being rendered. For example, a vertex shader processes attributes (position, texture coordinates, color, etc.) of a vertex, and a pixel shader processes attributes (texture values, color, z-depth and alpha value) of a pixel. In some instances, a pixel shader is referred to as a fragment shader.

It is to be appreciated that other types of shader processes may be provided. In an example, a particular sampling rate is utilized, within the graphical processing pipeline, for rendering an entire frame, or pixel shading is performed at a particular per-pixel rate. In this manner, a given client device (e.g., the client device 102) operates the graphical processing pipeline to convert information corresponding to objects into a bitmap that can be displayed by the electronic device.

Figure 8:
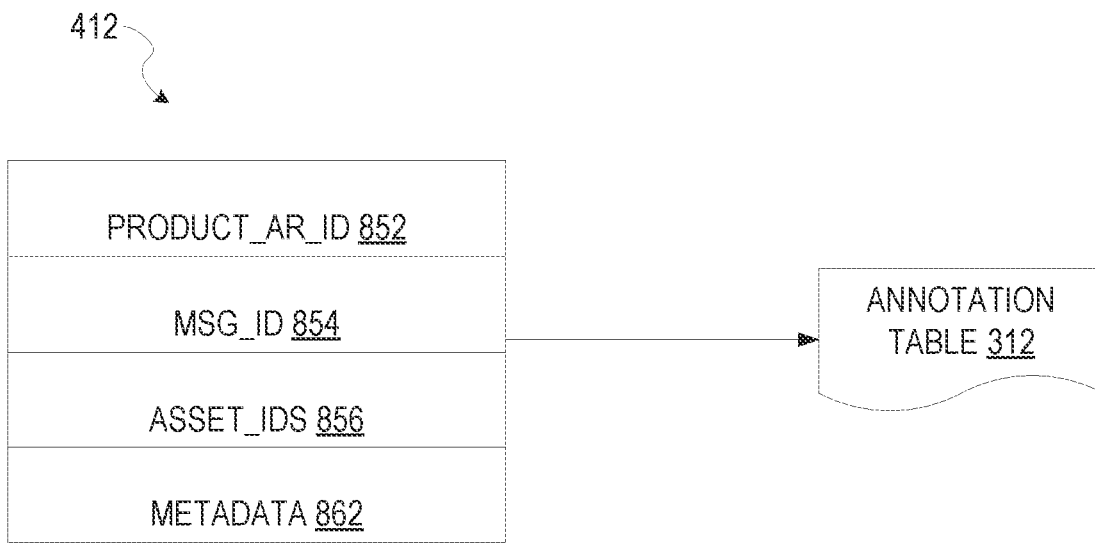
FIG. 8 is a schematic diagram illustrating a structure of the message annotations, as described in FIG. 4, including additional information corresponding to product metadata for a physical item (e.g., product), according to some embodiments.

FIG. 8 is a schematic diagram illustrating a structure of the message annotations 412, as described in FIG. 4, including additional information corresponding to an augmented reality experience for a product, according to some embodiments. In particular, the additional information corresponds to information in a message for presenting an AR experience for the.

In an embodiment, the content of a particular message 400 including the additional data shown in FIG. 8 is used to populate the message table 314 stored within the database 120 for a given message, which is then accessible by the product catalog system 124, or the messaging client application 104. As illustrated in an example embodiment, message annotations 412 includes the following components corresponding to data for a message:

A product augmented reality experience identifier 852: identifier of an augmented reality experience (e.g., augmented reality content generator, animation or effect, including an effect, LENSES, filter, image modifier, and the like) utilized in the message message identifier 854: identifier of the message asset identifiers 856: a set of identifiers for assets in the message. For example, respective asset identifiers can be included for a number of assets that is determined by the particular AR content generator. In an embodiment, such assets are created by the AR content generator on the sender side, uploaded to the messaging server application 114, and utilized by the AR content generator on the receiver side in order to recreate the message.

metadata 862 corresponding to additional metadata

Figure 9:
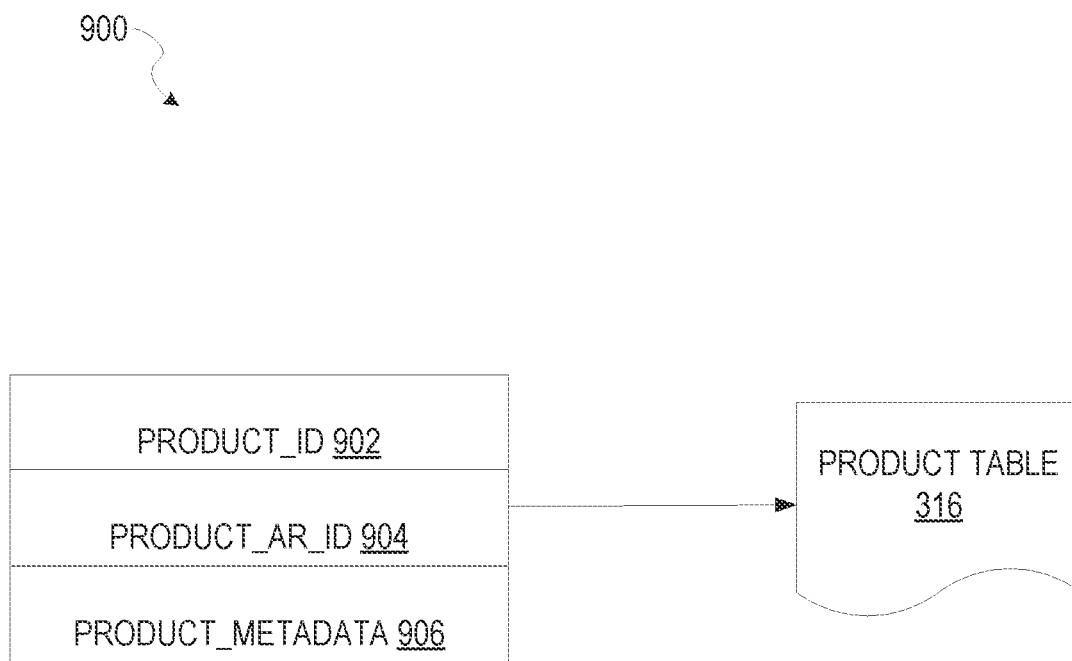
FIG. 9 is a schematic diagram illustrating a structure of product metadata stored in the product table, as described in FIG. 3, corresponding to information for a physical item (e.g., product), according to some embodiments.

FIG. 9 is a schematic diagram illustrating a structure of product metadata 900 stored in the product table 316, as described in FIG. 3, corresponding to information for a physical item (e.g., product), according to some embodiments.

In an embodiment, the data shown in FIG. 9 is used to populate the product table 316 stored within the database 120, which is then accessible by the product catalog system 124, or the messaging client application 104. As illustrated in an example embodiment, the product metadata 900 includes the following components:

A product identifier 902: identifier of a product (e.g., model number, part number, a unique serial number, etc.) extracted from the physical identification identifier from the image data A product augmented reality experience identifier 904: identifier of an augmented reality experience (e.g., augmented reality content generator, animation or effect, including an effect, LENSES, filter, image modifier, and the like) utilized in the message, which can be utilized to compare against the product augmented reality experience identifier 852 discussed in FIG. 8 product metadata 906: information related to the product corresponding to the product identifier 902

Figure 10:
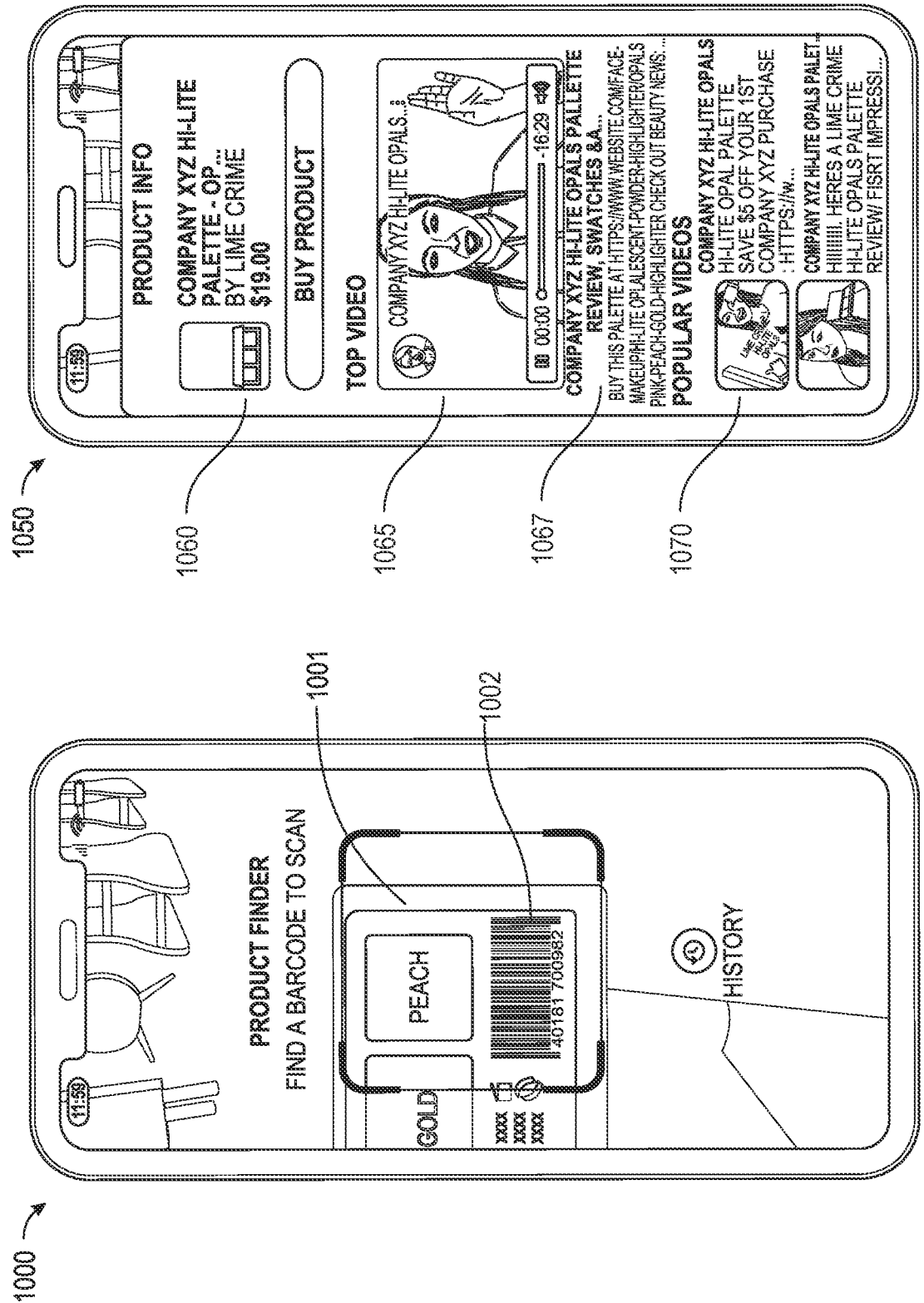
FIG. 10 illustrates example interfaces in which a user is capturing an image of a physical item with a physical identification indicator (e.g., a barcode), and displaying information based on the captured image in accordance with various embodiments.

FIG. 10 illustrates example interfaces in which a user is capturing an image of a physical item with a physical identification indicator (e.g., a barcode), and displaying information based on the captured image in accordance with various embodiments. The example interfaces of FIG. 10 can be provided for display on a client device (e.g., the client device), such as through an interface(s) of the messaging client application 104.

The client device 102 may have at least one camera. Each camera may be, for example, a charge-coupled device (CCD), an active pixel sensor in complementary metal-oxide-semiconductor (CMOS) or N-type metal-oxide-semiconductor (NMOS), an infrared or ultrasonic image sensor, or an image sensor utilizing other type of image capturing technologies. In an example, the user can position the client device 102 such that one or more physical objects, including a physical item 1001 (e.g., a beauty product box), are within a field of view of at least one camera of the client device 102, as shown in an interface 1000. The at least one camera can capture an image, such that a representation of the physical item 1001 with a representation of a physical identification indicator 1002 are displayed on a display screen of the client device 102. In some embodiments, the at least one camera captures video, providing a "live" view of the captured video information. The image or a frame of the video can be analyzed, such as by analyzing on the client device 102 or sending across a network (e.g., the network 106) to a server or service (e.g., the messaging server system 108 or the image processing system 116) for analyzing image data.

The client device 102, by using the product identification module 704, can extract product metadata, such as a product ID, based on the representation of the physical identification indicator 1002. The client device 102 then sends the extracted product metadata to the product catalog system 124 to receive additional product metadata. Based at least in part on the received manufacturer verification metadata, the client device 102 can send a request to the product catalog service system 602 for obtaining the additional product metadata, among other types of information that may be included as discussed herein.

In a second example illustrated in FIG. 10, an interface 1050 is provided showing additional information based at least in part on the product metadata described above, which may be received and displayed by the augmented reality content generator module 706 on the client device 102. As shown, production information 1060 is included (e.g., product description, price, manufacturer, vendor, selection graphical item to purchase the product). As further shown, media content 1065 (e.g., an embedded video), and additional media content 1070 are included in the interface 1050. In this example, the media content 1065 can be played directly within the interface 1050, whereas the additional media content 1070 may include respective descriptions and links to associated media content (e.g., respective video). Additional information 1067 related to the product, or related to the media content (e.g., a description of the media content 1065) can be included in the interface 1050. The type of media content included in the interface 1050 can be based at least in part on the user's profile data (which is described further below). In an embodiment, any or all of the aforementioned media content is provided (and stored) by an external source (e.g., a third party) separate from the client device 102 and the messaging server system 108.

In an embodiment, product metadata for a given product can include information from different categories/sources, including the following examples: 1) product description and/or other similar products 2) reviews, 3) ingredients, 4) tutorials (e.g., videos from a video streaming service(s), websites, etc.). It is understood, however, that the implementations described herein can be extensible for other product areas including any "vertical" such as particular products, industry areas, hobbies, topics, categories, and the like.

In an embodiment, when a user captures an image or video of a physical product and product metadata is received, the subject system (e.g., the product catalog system 124, or the client device 102) retrieves content from external sources (e.g., using one or more, or different APIs for various platforms) based on profile data indicating a persona, experience level, or level of expertise of the user (e.g., beginner, some experience, mid-tier experienced/dedicated learner, expert).

In an embodiment, such profile data is utilized by the system to rank and filter content (e.g., not show expert level videos for a beginner, or not show beginner level videos for an expert, show price info for product(s) when user is a frequent shopper, show videos first for user that heavily views such content). Ranking and filtering of content can be used in various places of the messaging platform described herein: 1) carousel interface (or other interface) providing a set of AR content generators, 2) advertisements provided by the subject system, or 3) external content (e.g., provided by an external source separate from the messaging server system 108) presented within the subject messaging platform (which is described in more detail in the second example of FIG. 10 below).

In an example, each content or augmented reality content generator that is considered for presentation to a user can include metadata indicating a persona, experience level, or level of expertise. In another example, the subject system can analyze the content or augmented reality content generator and then determine an associated persona, experience level, or level of expertise. Based on aforementioned metadata or association, the subject system can select particular content or augmented reality content generator(s).

In an example, respective scores, using a scoring algorithm based on the aforementioned signals and indicators of user activity, can be assigned to such content or AR content generators, and based on the respective scores the content or AR content generators can be ranked. In an example, a threshold value is used to filter the respective scores are used to filter content or AR content generators when the scores are below or fail to meet the threshold value.

Moreover, for determining a level of expertise or experience level, different types of user activity can be associated with particular score values and a sum of such score values indicates the user's expertise or experience level. For example, purchase of a product in a product segment may be assigned a first score value, viewing media content (e.g., a video) in the product segment (or topic) can be assigned a second score value, and sharing or posting or creating media content related to the product segment can be assigned a third score value. It is appreciated each score value can be a different value to indicate a relative level of importance or significance (e.g., greater score value for more significant activity and lower score value for less significant activity). It is further appreciated that other types of scoring approaches can be utilized. For example, based on signals indicating user activity, a particular user can accrue experience points to increase their sum of score values, and where product vendors or manufacturers or creators of various augmented reality experiences (e.g., respective augment reality content generators) can award points to incentivize/motivate the user to interact with content or purchase a particular product and thereby increase their level of expertise or experience. In an example, based on the aforenoted score values, a given user with a sum of score values from 0 to 10 is assigned a first level, a sum from 11-20 is assigned to a second level, a sum from 21-30 is assigned to a third level, and a sum greater than 30 is assigned to a fourth highest level. The aforementioned assigned level can then be utilized to select content or augment reality content generator(s) for presentation to the user (e.g., in an interface(s) provided by the messaging client application 104 or on the display screen of the client device 102).

In an embodiment, profile data (e.g., user profile information) is constructed based on different signals related to various user activity: whether viewing related content for a particular topic or product segment (e.g., beauty products) on the subject messaging platform (e.g., the messaging server system 108), shopping habits and historical data (e.g., which products have been purchased, from which vendors, and the like), historical information of videos that are viewed, historical information for previous web activity (e.g., which sites that are visited can indicate a level of interest or expertise of the user), and the like. A level of interest can refer, in an example, to an amount of user activity or involvement with respect to a particular topic or product segment. In an embodiment, example levels of expertise for a particular topic or product segment can be based on four example stages of competence e.g., 1) "unconscious incompetence" where the user does not understand or know how to do something and does not necessarily recognize the deficit, 2) "conscious incompetence" where even though the user may not understand or know how to do something, the user recognizes the deficit, as well as the value of a new skill in addressing the skill deficit, 3) "conscious competence" where the user understands or knows how to do something, and 4) "unconscious competence" where the user can perform the skill easily, and the user may be able to teach the skill to others. However, it is appreciated that there may be fewer or more levels of expertise can be utilized by the subject system based on the profile data of the user, or based on a particular type of product segment. Moreover, the levels of expertise can correspond to different types of levels than the aforementioned four levels of expertise.

In an example, in a product segment corresponding to beauty products, different levels of expertise or a persona can associate a given user based on their profile data to a level including 1) beginner (a newcomer persona), 2) intermediate ("makeup curious" persona), 3) experienced ("tutorial warrior" persona), and 4) expert ("beauty goddess" persona). As mentioned above, based on the associated level to the user, various media content can be included in the interface 1050 for presentation to the user on the client device 102.

In an embodiment, it is contemplated, in an embodiment, that the messaging server system 108 provides content within the messaging server system 108, and provide such content to users of the system based on respective profile data. However, in some embodiments, media content provided in the examples described herein are understood to be provided by at least one external source (e.g., external web site, external database, external web service, and the like).

Figure 11:
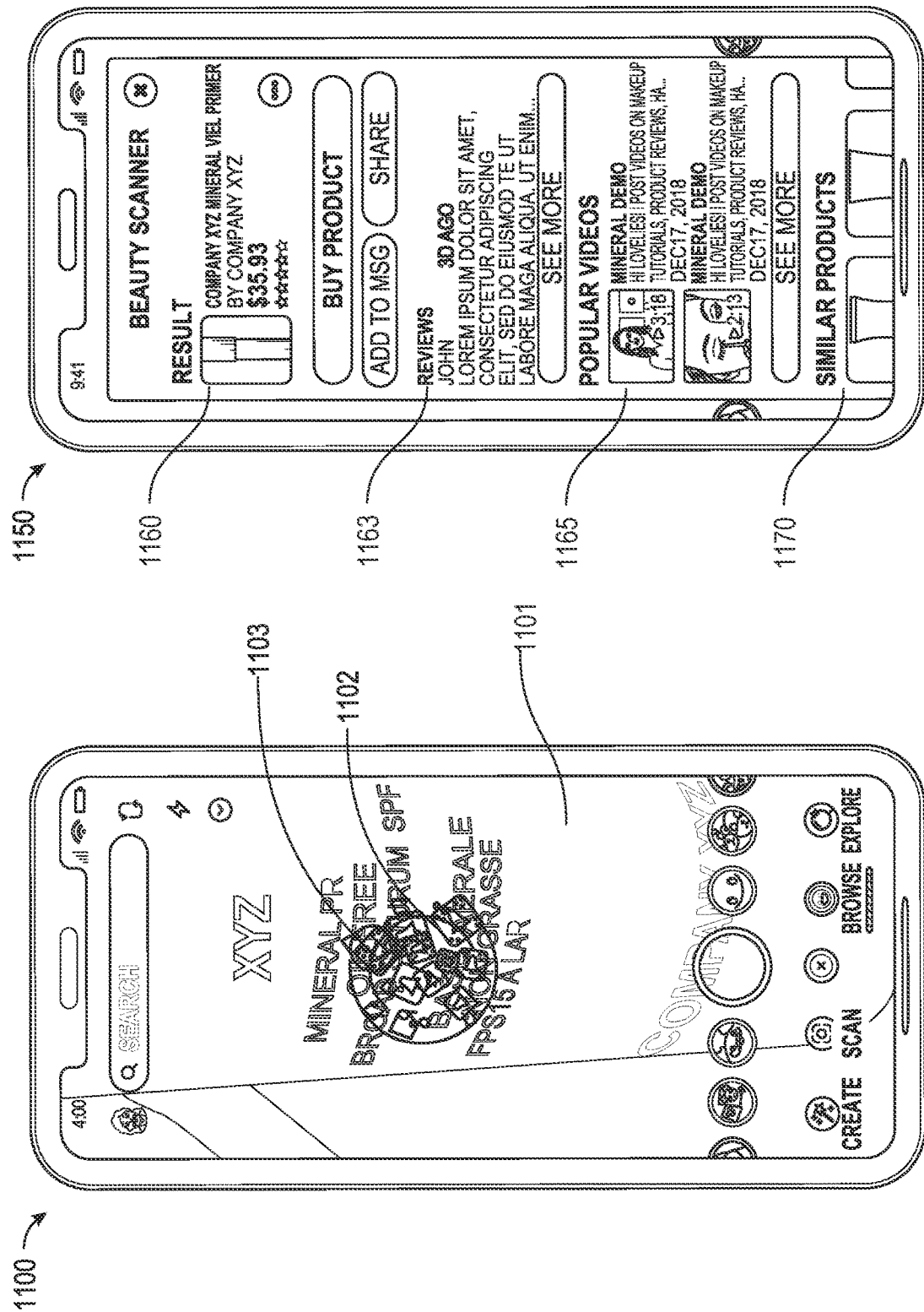
FIG. 11 illustrates example interfaces in which a user is capturing an image of a physical item, and displaying information based on the captured image in accordance with various embodiments.

FIG. 11 illustrates example interfaces in which a user is capturing an image of a physical item, and displaying information based on the captured image in accordance with various embodiments. The examples illustrated in FIG. 11, in particular, show a scenario in which a user, using the client device 102, scans a physical product (e.g., beauty product) using a camera provided by the client device 102. The client device 102 (or the product catalog system 124) then performs a recognition process on the captured image(s) to provide additional information in an interface, which includes graphical items, some of which are selectable by the user to perform additional operations or provide additional functionality with respect to media content and tasks that can be performed in connection with the product. The example interfaces of FIG. 11 can be provided for display on a client device (e.g., the client device), such as through an interface(s) of the messaging client application 104.

In an embodiment, as mentioned before, the product catalog system 124 can include a library of 3D objects and images (e.g., stored on database 120) which are used for recognition processes. Further, product manufacturers or product vendors can provide such models for storing on the product catalog system 124.

In a first example of FIG. 11, a graphical animation 1102 is provided in an interface 1100 indicating that the user has initiated a recognition process on a physical item 1101 (e.g., beauty product) based on a focal region 1103 of the camera (e.g., the middle or center region of the display screen of the client device 102). The product identification module 704 can perform such a recognition process, and the graphical animation 1102 can be displayed by the augmented reality content generator module 706 on the client device 102. In an embodiment, the user can perform an image capture process using the messaging client application 104 (e.g., using one or more components described in FIG. 7 such as the image data receiving module 702), and have the product in the view of the camera of the client device 102 which sends captured image data to the product identification module 704 executing on the client device 102. In an embodiment, the product identification module 704 can analyze the captured image data to determine product metadata associated with the product recognized from the image data, including using the aforementioned library of 3D objects and images (e.g., stored on database 120) to recognize/identify the product. Alternatively or conjunctive, the captured image(s) can be sent by the product identification module 704 to the product catalog system 124 for analysis and recognition based on the aforementioned library.

In a second example of FIG. 11, an interface 1150 is provided showing additional information based at least in part on the product metadata from the product recognition described above, which may be received and displayed by the augmented reality content generator module 706 on the client device 102. As shown, production information 1160 is included (e.g., product description, price, selection graphical item to purchase the product). As further shown, a review 1163 of the product, and additional media content 1165 are included in the interface 1050. In this example, the additional media content 1070 may include respective descriptions and links to associated media content (e.g., respective video). Further, a set of similar products 1170 related to the product can be included in the interface 1150. The type of media content included in the interface 1150 can be based at least in part on the user's profile data (as described previously above). In an embodiment, any or all of the aforementioned media content is provided (and stored) by an external source (e.g., a third party) separate from the client device 102 and the messaging server system 108.

Figure 12:
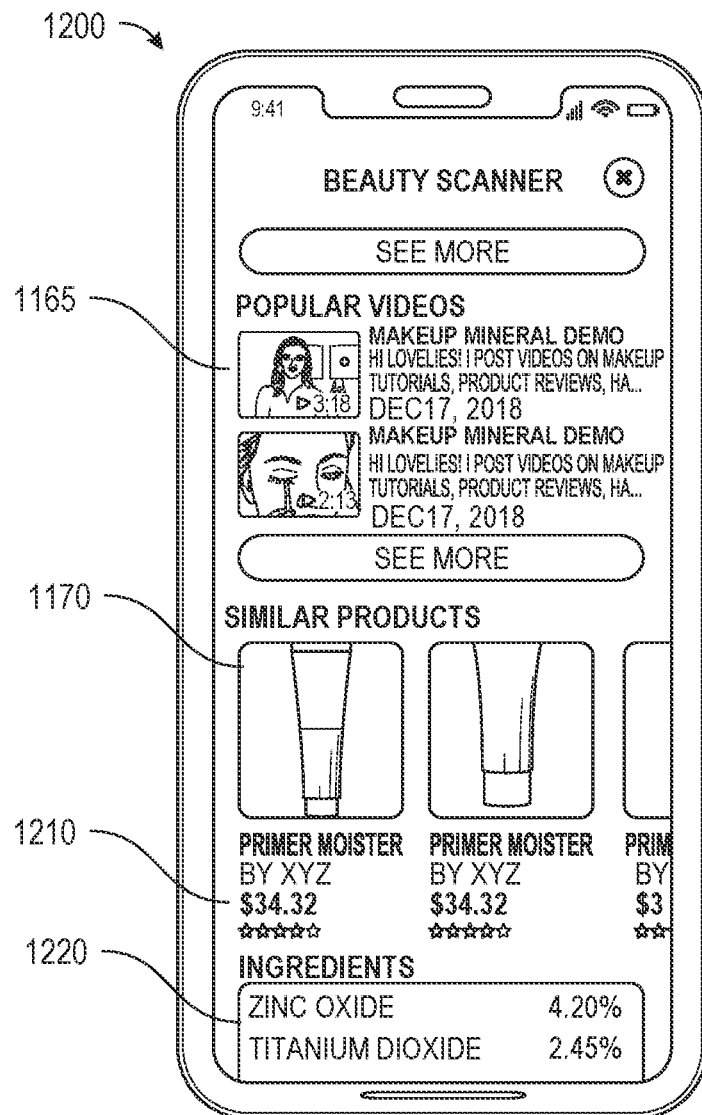
FIG. 12 illustrates example interface displaying information based on the recognized product described in FIG. 11 in accordance with various embodiments.

FIG. 12 illustrates example interface displaying information based on the recognized product described in FIG. 11 in accordance with various embodiments. The example interfaces of FIG. 12 can be provided for display on a client device (e.g., the client device), such as through an interface(s) of the messaging client application 104.

As illustrated, an interface 1200 includes the set of similar products 1170 described before, and the additional media content 1165 also as described before, which may be received and displayed by the augmented reality content generator module 706 on the client device 102. As shown, each product from the set of similar products 1170 includes an associated image showing a graphical representation of a particular product. Further, the interface 1200 includes related product information 1210 (e.g., product name, manufacturer name, price, rating) respectively corresponding to a particular product from the set of similar products 1170. The interface 1200 also includes a list of ingredients 1220 for a particular product. It is appreciated that other types of information may be presented on the interface 1200 and still be within the scope of the technology.

Implementations of the subject technology enable, using a client device (e.g., the client device 102) in order to scan a user's face (e.g., using the camera on the client device 102) and using machine learning techniques, or other techniques, to identify facial characteristics (e.g., face shape) and, based on user input or preferences, determine which products to suggest or provide for presentation to the user on the display of the client device.

Based on a determined face shape, the subject system is enabled to provide recommendations such as for a haircut, contouring method, shade of makeup, and the like. Further, in an embodiment, the subject technology provides different augmented reality content generators, utilities, tools, or additional content as recommendations. In this manner, scanning a user's face enables the face to become a "portal" to other content, digital locations, applications. Moreover, it is appreciated that the aforementioned implementations also has health-related uses e.g., scanning a face and enabling the subject system to determine health-related recommendations, or analyzing facial characteristics to identify problems or suggest skincare routines.

Figure 13:
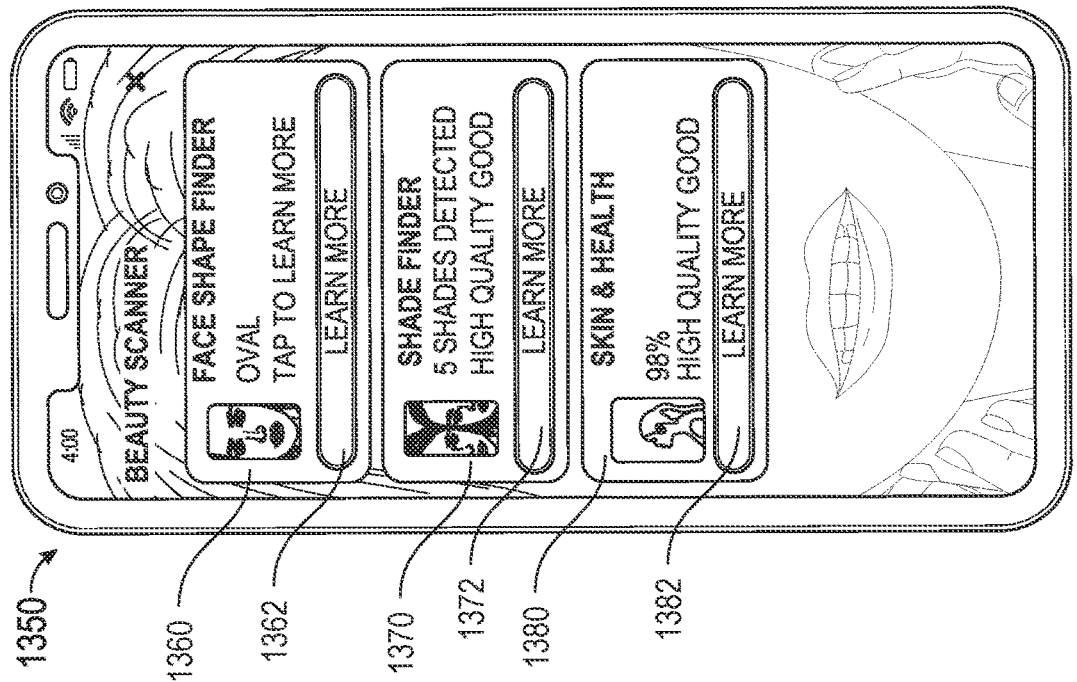
FIG. 13 illustrates example interfaces for scanning a user's face and presenting various information based on detected features or facial characteristics, in accordance with some embodiments.
Figure 13:
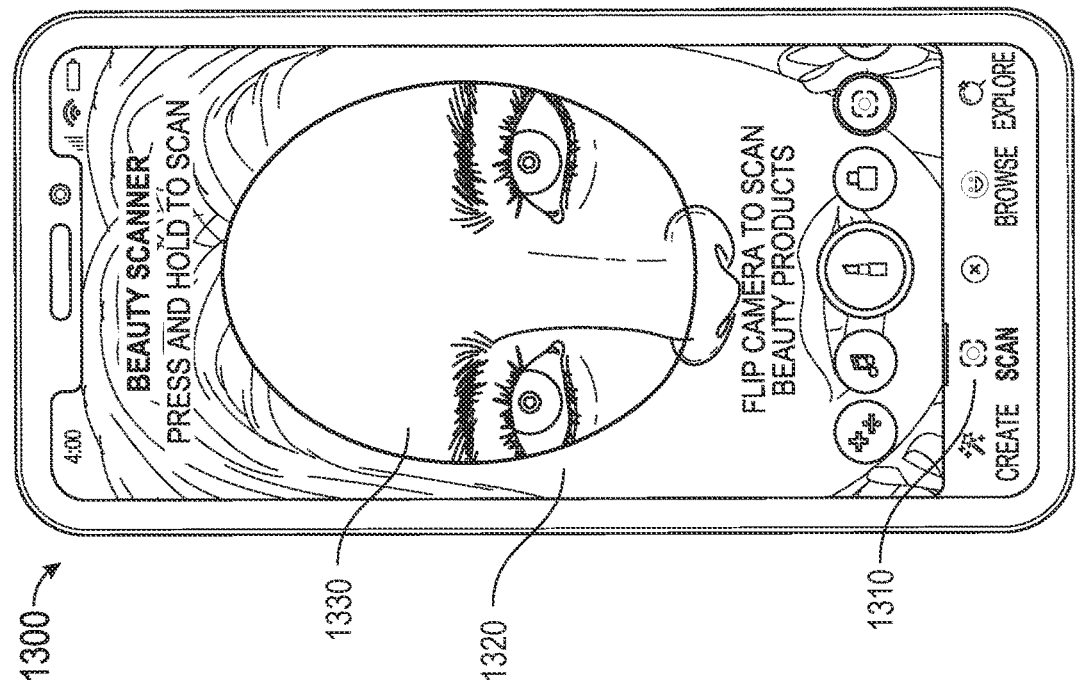

FIG. 13 illustrates example interfaces for scanning a user's face and presenting various information based on detected features or facial characteristics, in accordance with some embodiments. As mentioned above, the example interfaces of FIG. 13 can be provided for display on a client device (e.g., the client device), such as through an interface of the messaging client application 104.

In a first example, an interface 1300 is provided for scanning features of a representation of a face 1320, based on captured image data, within a focal region 1330. In an example, a selectable graphical item 1310 was selected (e.g., through user input) to cause a display of the interface 1300. The camera used to capture image data, in this example, can be a front-facing camera of the client device 102. In an embodiment, a selectable graphical item 1312, corresponding to a particular augmented reality content generator, has been previously selected in order to cause the interface 1300 to be displayed on the display screen of the client device 102. The particular augmented reality content generator, in this example, provides functionality to scan at least a portion of the user's face to identify a set of facial characteristics, which may be utilized to provide recommendations and other content for presentation to the user.

In accordance with some embodiments, the focal region 1330 can be analyzed (e.g., by the product identification module 704 or other component of the client device 102) using techniques described below to attempt to identity feature points corresponding to one or more facial features of the user's face and other facial characteristics. For example, the image data captured the camera of the client device can be analyzed by a set of detection techniques to detect a facial feature (e.g., a right eye or a left eye of a user), where each detection technique of the set of detection techniques can detect the facial feature using a different technique. The different techniques can include using different sized windows to detect facial features, different starting positions of the windows, etc. Other techniques can be utilized, such as to use shape, template, or object recognition processes. In some embodiments, an object location technique can look for objects in the image data that meet a certain object detection criterion, such as objects (e.g., areas of a relatively common intensity in an image) of a certain size, shape, and/or location.

Further, in some embodiments, the image data captured by the client device 102 can be analyzed to estimate the center of the head of the user or location of another feature of the user. Some example techniques utilize model based techniques. One example model based technique is active shape model (ASM). In this technique, a model of several facial feature locations and their relationship with image intensities around the feature points is learned. The model is learned, for example, using a training dataset including training images. During run-time, the model is applied to obtain the best fit of all the facial features to given image data. Another technique includes constrained local models (CLM) in which sets of points (constrained by a statistical shape model) are located on a given image data. In this technique, detection techniques are applied to detect different features on the face independently. In some examples, a different detection technique is trained for the right eye, left eye, mouth, etc. In an example, a single detection technique is utilized for each landmark and the detection techniques are applied to the image and a model is fitted to the detection technique responses to obtain the best fit of all facial features to the given face image.

Additionally, in accordance with some embodiments, a facial feature can be detected using multiple tuned detection techniques. The facial feature can be, for example, the location of eyes, location of mouth, nose or any identifiable feature on the human face. Several detection techniques can be trained for a chosen feature. At run-time, at least a portion of the detection techniques can be applied. In some embodiments, the detection techniques can be associated with a confidence value. The detection techniques can provide an estimate of the center of the head of the user and the estimates can be combined according to their confidence value or otherwise combined to obtain a determined location of the center of the head.

After the facial region to be analyzed is determined (e.g., based at least on the focal region 1330), one or more head or face detection techniques can be used to identify a region of the user's face. Example head or face detection techniques can include any appropriate technique known or used for such purposes, such as a template matching technique, a neural network technique (e.g., using a deep neural network, or a convolutional neural network), and the like), a Fisher linear discriminant technique, a maximal rejection classifier technique, a support vector machine technique, an edge filtering technique, an edge detection technique, and the like.

In some embodiments, the aforementioned detection techniques can determine the facial features and facial characteristics using a number of different techniques. This can include, for example, identifying (e.g., recognizing) unique or distinguishing points such as feature points, facial marks, geometric shapes or distances, or other such features on the face. Example facial recognition techniques can include, for example, a linear discriminate analysis technique, a Hidden Markov model-based technique, a principal component analysis technique, a Fisherface technique, and a neuronal motivated dynamic link matching technique, and the like. In some embodiments, specially trained Haar classifiers or other like classifiers can be used to detect the facial features. It should be appreciated that any number of techniques can be used. In various embodiments, the facial features can include at least one of an eye, mouth, nose, shape of a head, forehead, cheek, chin, jaw or any other facial feature.

In some embodiments, other object recognition processes can be used. These can include, for example, appearance-based processes that search for features such as edges, changes in lighting or color, or changes in shape or size. Various other techniques utilize gradient generation and matching or histogram analysis for object recognition. Other techniques include feature-based techniques, such as may utilize interpretation trees, geometric hashing, or invariance analysis. Moreover, techniques such as scale-invariant feature transform (SIFT) or speeded up robust features (SURF) techniques can also be used within the scope of the subject technology.

In a second example of FIG. 13, an interface 1350 is provided with information and graphical items as a result of the analysis performed as described above in the first example involving the interface 1300, which may be received and displayed by the augmented reality content generator module 706 on the client device 102.

As shown, the interface 1350 includes a graphical item 1360 (e.g., floating window or dialog box), graphical item 1370, and graphical item 1380 that are superimposed over the captured image of the user's face. Each of the aforementioned graphical items includes information regarding a detected feature(s) or facial characteristic(s), such as a face shape (e.g., oval), indication of skin health, etc. Moreover, the interface 1350 includes a selectable graphical item 1362 (e.g., button), selectable graphical item 1372, and selectable graphical item 1382 that can each be selected by user input to cause a display of a separate interface to show additional information as described further below.

Figure 14:
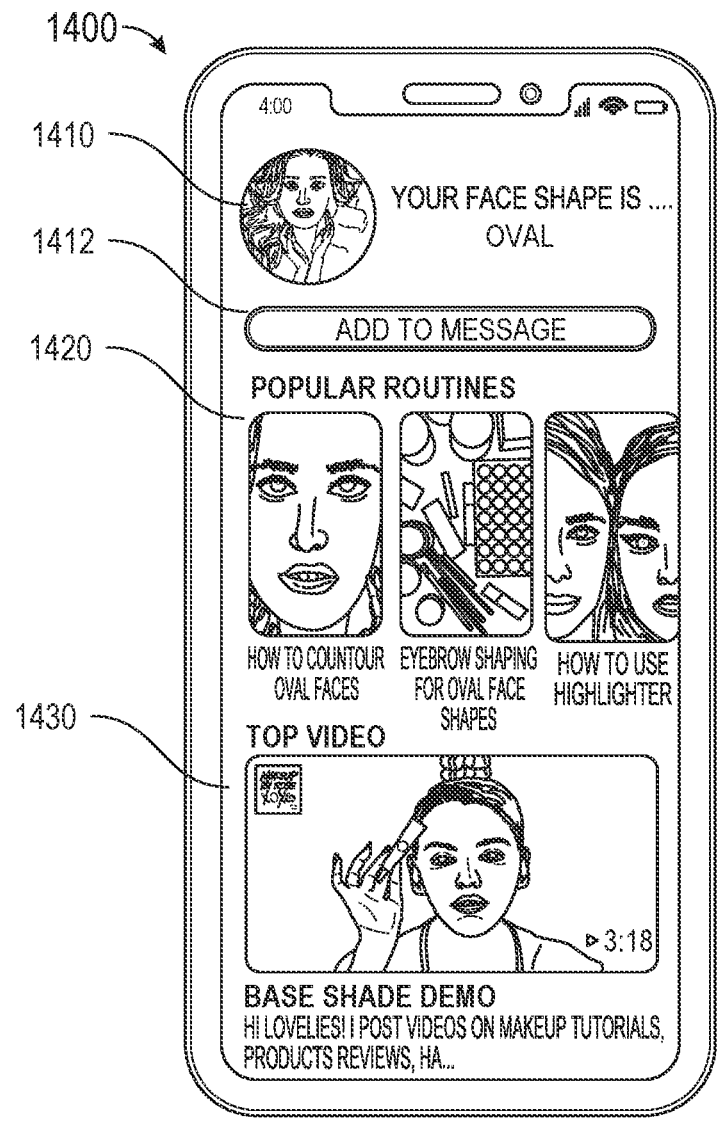
FIG. 14 illustrates an example interface presenting various information based on a detected feature or facial characteristic (e.g., face shape), in accordance with some embodiments.

FIG. 14 illustrates an example interface presenting various information based on a detected feature or facial characteristic (e.g., face shape), in accordance with some embodiments. As mentioned above, the example interface of FIG. 14 can be provided for display on a client device (e.g., the client device), such as through an interface of the messaging client application 104.

In the example of FIG. 14, an interface 1400 is provided for display on the display screen of the client device 102 after selection of the selectable graphical item 1362 in an example, which may displayed by the augmented reality content generator module 706 on the client device 102.

As shown, a graphical item 1410 is included showing the detected face shape of the user. A selectable graphical item 1412 (e.g., a button) is included to enable adding this information regarding the detected face shape to a message. Media content 1420 includes respective descriptions and previews or graphical representations (e.g., images or short videos) of associated media content (e.g., respective videos of tutorial or beauty routines, web links, etc.). Moreover, additional media content 1430 includes a respective description and preview or graphical representations (e.g., images or short videos) of associated media content indicating a top ranked video for a beauty routine. In an example, the additional media content 1430 includes an embedded video that can be played within the interface 1400, without requiring the user to navigate to a different interface or screen. In an embodiment, any or all of the aforementioned media content is provided (and stored) by an external source (e.g., a third party) separate from the client device 102 and the messaging server system 108.

Figure 15:
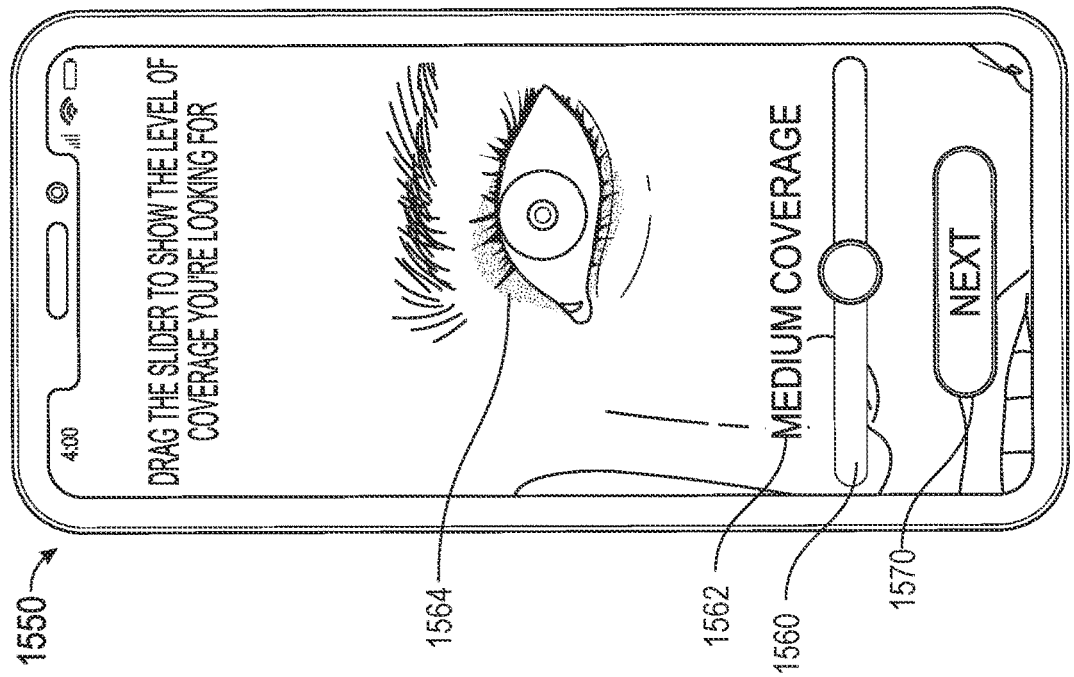
FIG. 15 illustrates example interfaces presenting various options for applying a particular product (e.g., shades of makeup products) based on detected a feature or facial characteristic (e.g., face shape or skin type) to provide an augmented reality experience, in accordance with some embodiments.
Figure 15:
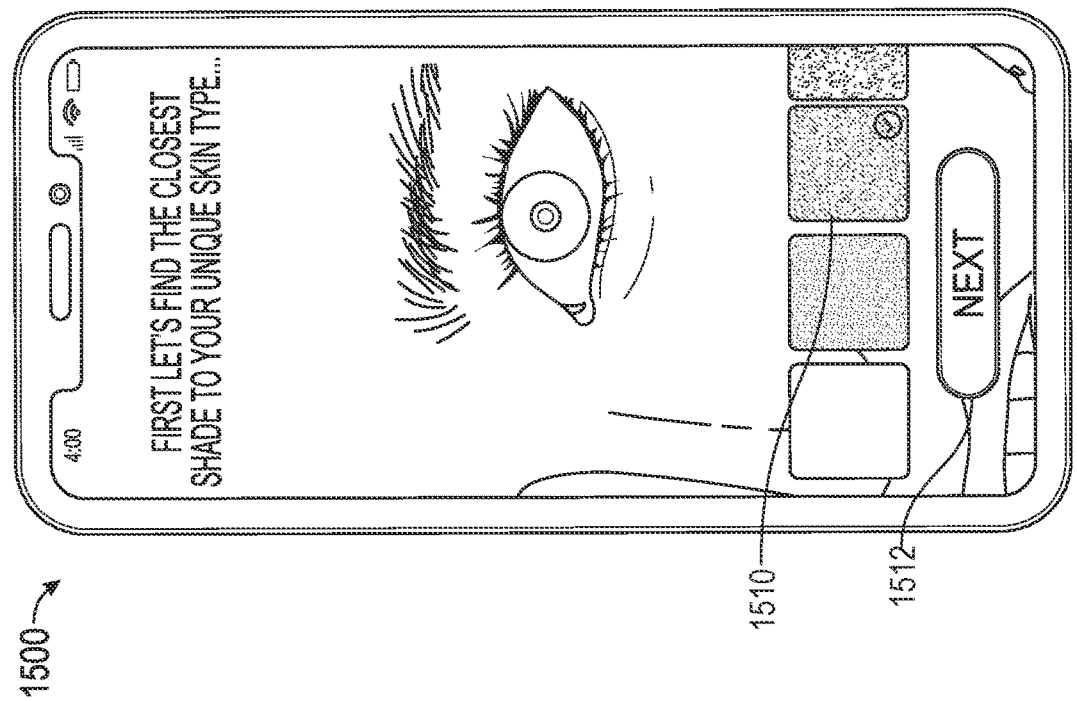

FIG. 15 illustrates example interfaces presenting various options for applying a particular product (e.g., shades of makeup products) based on detected a feature or facial characteristic (e.g., face shape or skin type) to provide an augmented reality experience, in accordance with some embodiments. As mentioned above, the example interfaces of FIG. 15 can be provided for display on a client device (e.g., the client device), such as through an interface of the messaging client application 104. Further, in an example, the interfaces described in FIG. 15 can be displayed after the user has selected the selectable graphical item 1372 described in FIG. 13.

In a first example, an interface 1500 is provided, which may displayed by the augmented reality content generator module 706 on the client device 102. As further shown, captured image data of a user's face is included in the background of the interface 1500. A set of selectable graphical items, including a selectable graphical item 1510, are displayed which correspond to respective augmented reality content generators associated with shades of a beauty product (e.g., makeup, shade, foundation, and the like). In an embodiment, the set of selectable graphical items are selected and presented in a carousel interface (as described before other types of interfaces may be utilized instead) in the interface 1500 based on the detected feature or facial characteristic (e.g. skin type). The selectable graphical item 1510, corresponding to a particular augment reality content generator for a particular shade of makeup, is illustrated as being selected by the user in this example. A selectable graphical item 1512 is included, which when selected by the user, causes a second interface to be shown which provides for additional options for providing augmented reality content (e.g., application of the selected shade or type of makeup on captured image data including the user's face).

In a second example, an interface 1550 is provided, which may displayed by the augmented reality content generator module 706 on the client device 102. As mentioned above, the interface 1550 can be displayed as a result of the selection of the selectable graphical item 1512. A selectable graphical item 1560 (e.g., a slider) is provided to control augmented reality content that is displayed on a representation of the user's face in the interface 1550. As illustrated, information 1562 is provided indicating a setting (e.g., medium coverage) corresponding to the position of the selectable graphical item 1560. As the selectable graphical item 1560 is moved by user input, an amount or rendering of corresponding augmented reality content can be updated based on the current position of the selectable graphical item 1560 that corresponds to respective setting. In this example, the position of the selectable graphical item 1560 corresponds to a "medium" setting (as the slider is in the middle), which results in augmented reality content 1564 to be rendered, based on this setting, on a portion of the user's face in the captured image data. As also shown, a selectable graphical item 1570 is provided, which when selected through user input can cause another interface to be displayed on the client device, such as a rendering of the user's face with the applied makeup in the form of the augmented reality content applied to the captured image data.

Figure 16:
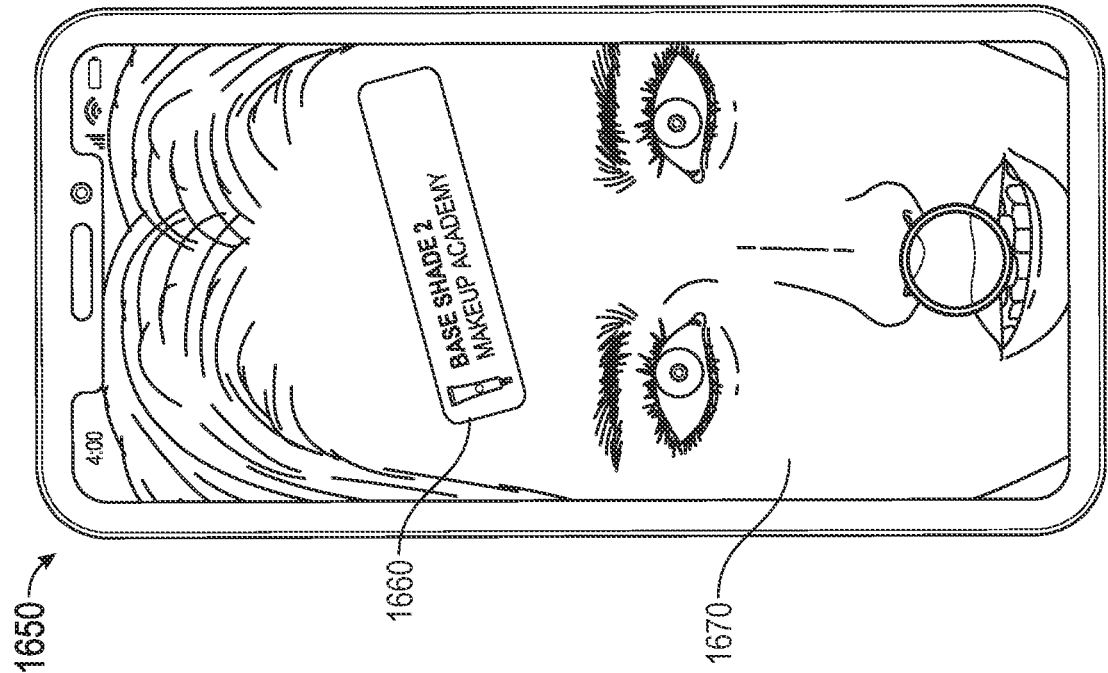
FIG. 16 illustrates example interfaces presenting product information and an application of the product to a representation of a user's face to provide an augmented reality experience, in accordance with some embodiments.
Figure 16:
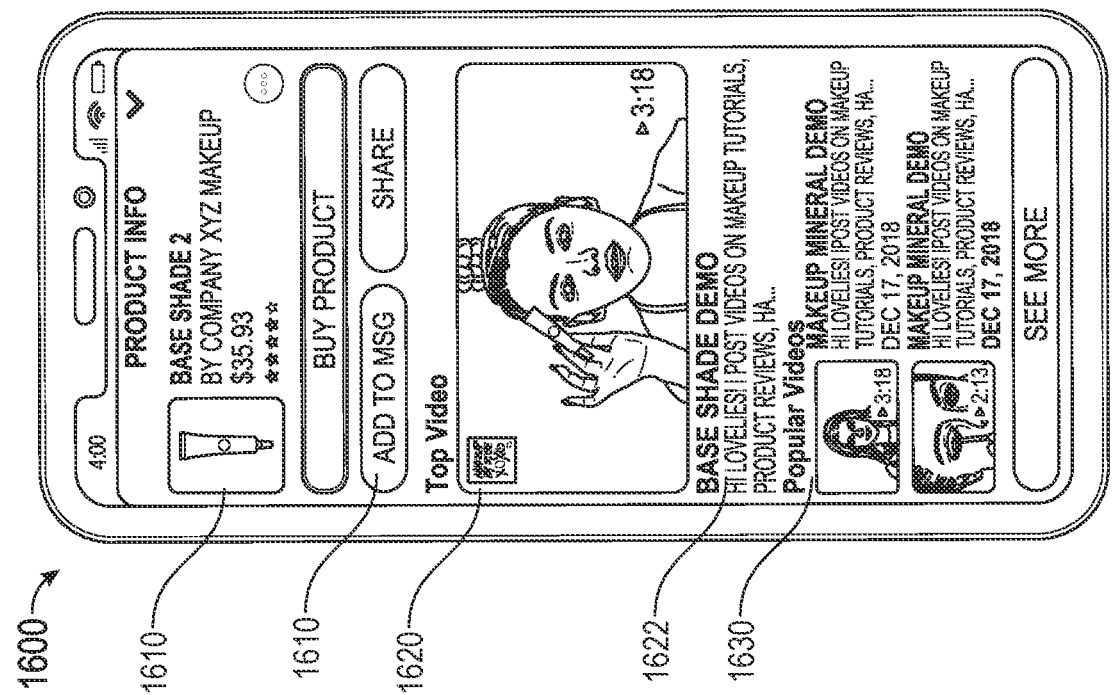

FIG. 16 illustrates example interfaces presenting product information and an application of the product to a representation of a user's face to provide an augmented reality experience, in accordance with some embodiments. As mentioned above, the example interfaces of FIG. 16 can be provided for display on a client device (e.g., the client device), such as through an interface of the messaging client application 104.

In a first example illustrated in FIG. 16, an interface 1600 is provided showing information of product based at least in part on product metadata, which may be received and displayed by the augmented reality content generator module 706 on the client device 102. As shown, production information 1610 is included (e.g., product description, price, manufacturer, vendor, selection graphical item to purchase the product). As further shown, media content 1620 (e.g., an embedded video), and additional media content 1630 are included in the interface 1050. In this example, the media content 1620 can be played directly within the interface 1600, whereas the additional media content 1630 may include respective descriptions and links to associated media content (e.g., respective video). Additional information 1622 related to the product, or related to the media content (e.g., a description of the media content 1620) can be included in the interface 1050. The type of media content included in the interface 1600 can be based at least in part on the user's profile data (as described previously above). In an embodiment, any or all of the aforementioned media content is provided (and stored) by an external source (e.g., a third party) separate from the client device 102 and the messaging server system 108.

In a second example, an interface 1650 (which may be displayed by the augmented reality content generator module 706 on the client device 102) is shown with augmented reality content 1660 indicating the product that has been applied as augmented reality content 1670 on the captured image data corresponding to a representation of the user's face. In this manner, an augmented reality experience can be provided by the subject system to enable the user to view an example application of the product to the user's face.

Figure 17:
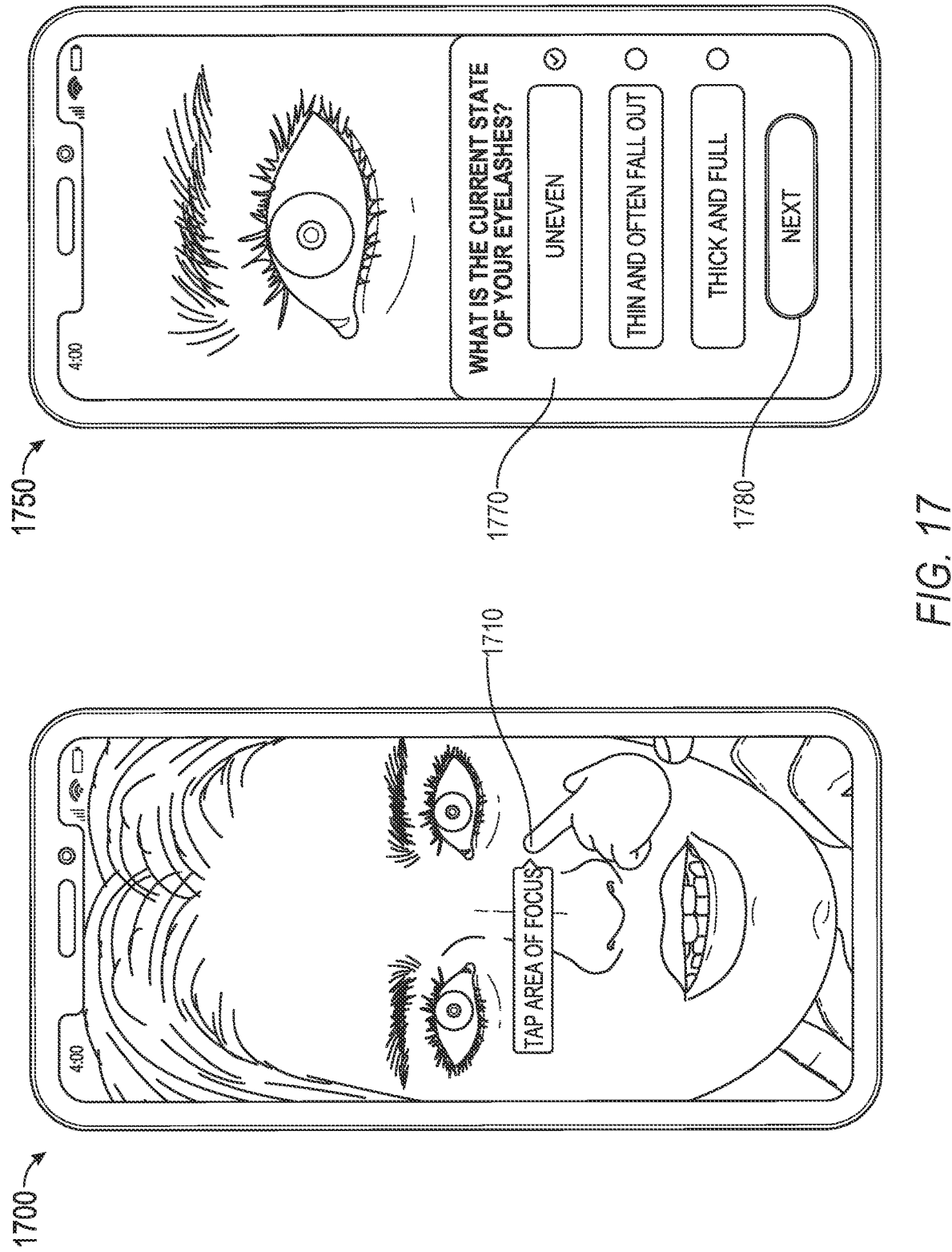
FIG. 17 illustrates example interfaces enabling a selection of a portion of a representation of a user's face for analysis and a selection of an option to indicate a facial characteristic based on the selected portion, in accordance with some embodiments.

FIG. 17 illustrates example interfaces enabling a selection of a portion of a representation of a user's face for analysis and a selection of an option to indicate a facial characteristic based on the selected portion, in accordance with some embodiments. As mentioned above, the example interfaces of FIG. 17 can be provided for display on a client device (e.g., the client device 102), such as through an interface of the messaging client application 104.

In a first example illustrated in FIG. 17, an interface 1700 is provided showing a selectable graphical item 1710 (e.g., a cursor in the shape of a hand pointing a finger). Based on user input (e.g., a touch input, or gesture), the selectable graphical item 1710 can be manipulated by the user to select a portion of the representation of the user's face (e.g., based on captured image data) shown in the interface 1700.

In a second example of FIG. 17, an interface 1750 is provided for display including a set of selectable graphical items 1770 for selecting a particular option to indicate a current state of the selected portion of the representation of the user's face as discussed above. As shown, the selectable graphical items 1770 includes respective items corresponding to three options (e.g., "uneven", "thin and often fall out", and "thick and full"). A selectable graphical item 1780 (e.g., a button) is included that can be selected after the selection of one of the selectable graphical items 1770. In an embodiment, selection of the selectable graphical item 1780 causes a different interface to be shown on the display screen of the client device 102, which may include additional information related to health or tips.

Figure 18:
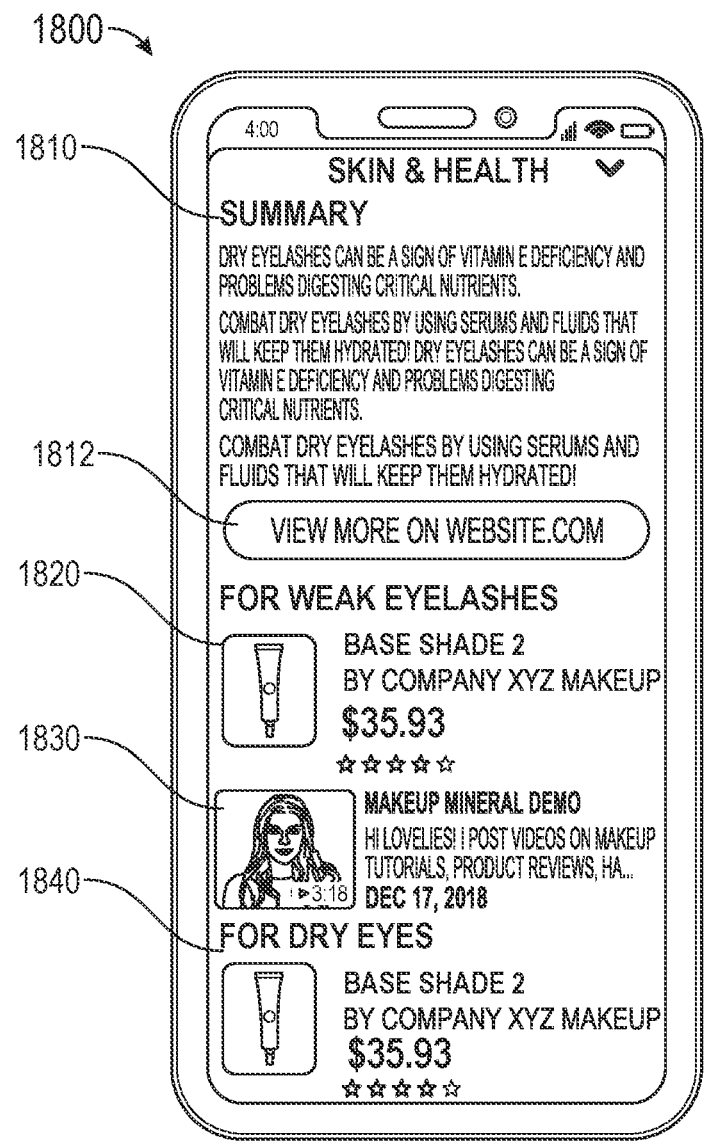
FIG. 18 illustrates an example interface presenting various information based on a detected feature or facial characteristic (e.g., skin type) or a selection by the user (e.g., type of eyelashes, dry eyes), in accordance with some embodiments.

FIG. 18 illustrates an example interface presenting various information based on a detected feature or facial characteristic (e.g., skin type) or a selection by the user (e.g., type of eyelashes, dry eyes), in accordance with some embodiments. As mentioned above, the example interface of FIG. 18 can be provided for display on a client device (e.g., the client device), such as through an interface of the messaging client application 104.

In the example of FIG. 18, an interface 1800 is provided for display on the display screen of the client device 102 after selection of the selectable graphical item 1780 of FIG. 17 in an example, which may displayed by the augmented reality content generator module 706 on the client device 102. Alternatively or conjunctively, the interface 1800 may be provided for display upon selection of the selectable graphical item 1382 in FIG. 13.

As shown, information 1810 (e.g., a type of media content in the form of text) is included showing information based on a detected facial characteristic of the user (e.g., skin or face condition, eye condition, and the like), which can be based on the analysis performed by the product identification module 704, or based at least in part on the option selected by the user discussed in the second example of FIG. 17. A selectable graphical item 1812 (e.g., a button) is included to enable navigation to an external source (e.g., external web site) to view additional information. In an embodiment, the information 1810 maybe be stored in the database 120 and accessed by the product identification module 704, which is then provided to the augmented reality content generator module 706 for displaying in the interface 1800 to the user.

Based on the information provided in information 1810, a graphical item 1820 is included showing information related to a product as a recommendation to address a condition of the user's face (e.g., weak eyelashes). In an example, based on a determined facial characteristic, the product identification module 704 can search the product table 316 to identify one or more products that correspond to the facial characteristic (e.g., if a health condition exists which can be addressed by a particular product). In this example, the determined facial characteristics correspond to "dry eyelashes" or "weak eyelashes", and the product identification module 704 can search the product table 316 (which is populated with product information and other additional metadata which indicate, for one or more products, what types of health conditions that such products can address through use by a given user).

It is appreciated that providing recommendations for other types of health conditions are contemplated by the subject technology. For example, a skin or health-related condition corresponding to dry skin, oily skin, combination skin, sunburns, acne, eczema, rosacea, ichthyosis, dermatitis, and the like can be identified by the subject system and recommendations (e.g., products, additional information, and media content) may be provided for presenting in the interface 1800 (or another interface). Also, recommendations for beauty routines, not necessarily related to a health condition, may be provided to the user, such as recommendations for a particular haircut, eyewear based on detected head shape, makeup based on a detected skin tone, among others.

As further shown, media content 1830 includes a respective preview or graphical representation (e.g., image or short video) of associated media content (e.g., respective videos of tutorial or beauty routines, web links, etc.) which make demonstrate how to apply the product shown in the graphical item 1820 (or some other product not shown in the interface 1800). Moreover, a graphical item 1820 is included showing information related to a second product as a recommendation to address a second condition of the user's face (e.g., weak eyelashes). In an embodiment, any or all of the aforementioned media content is provided (and stored) by an external source (e.g., a third party) separate from the client device 102 and the messaging server system 108. Media content 1840 corresponds to a recommendation for a health-related condition (e.g., "dry eyes") based on a particular product in the form of a graphical representation of the product and additional information (e.g., price, vendor information, manufacturer information, a rating).

The following discussion relates to using AR techniques (e.g., an augmented reality content generator) to provide swatching (e.g., makeup for coloring around the eyes), where a color palette is scanned which is then applied as augmented reality content to a representation of a user's face. The term "swatching" as mentioned here refers to applying a sample of makeup (or other material or product that can be applied) to a surface of a user's skin to test or demonstrate the color(s) associated with the makeup.

Figure 19:
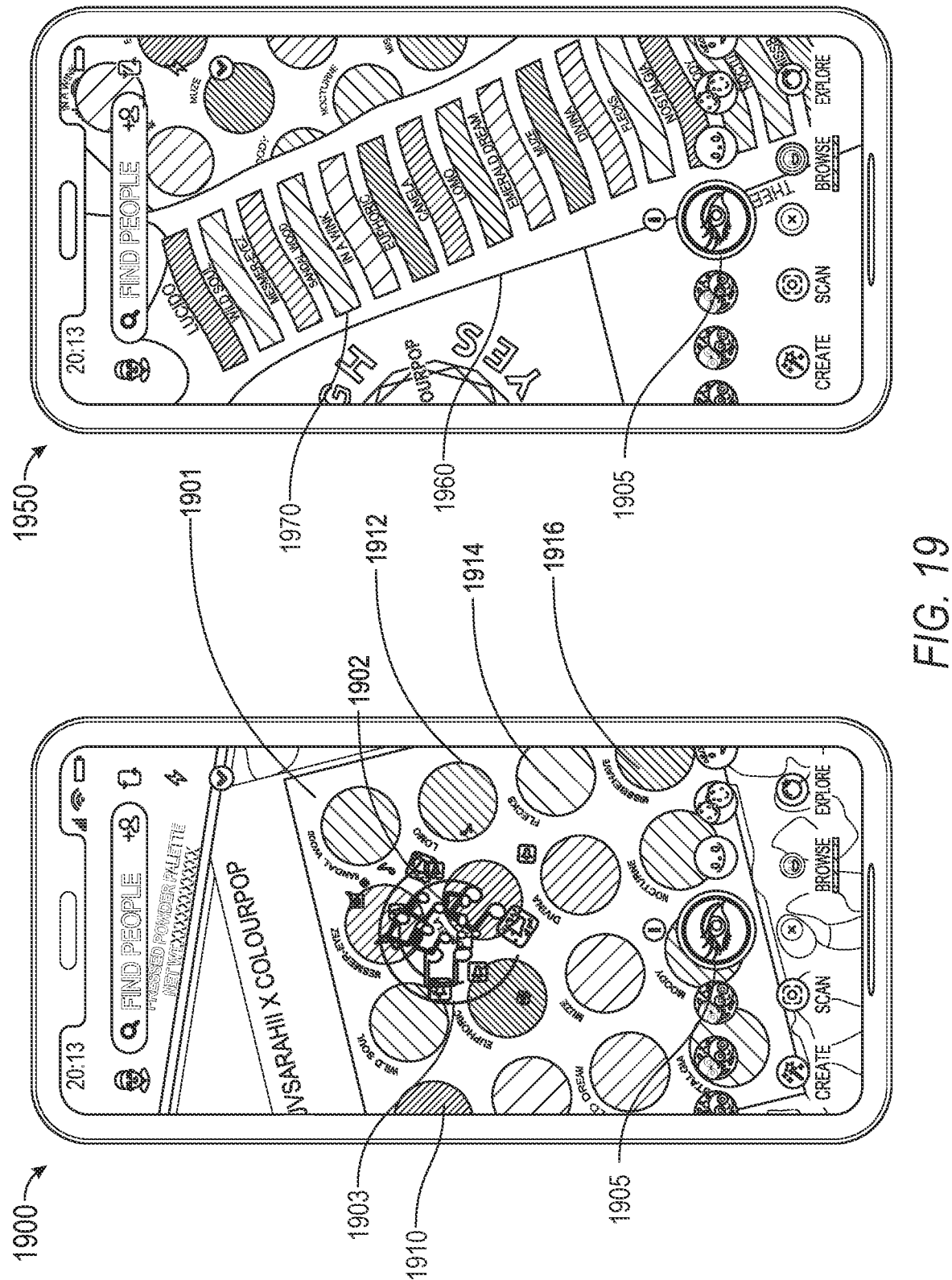
FIG. 19 illustrates example interfaces in which a user is capturing an image of a physical item (e.g., makeup palette), and displaying augmented reality content onto a portion of a representation of a user's body (e.g., forearm) based on the captured image in accordance with various embodiments.

FIG. 19 illustrates example interfaces in which a user is capturing an image of a physical item (e.g., makeup palette), and displaying augmented reality content onto a portion of a representation of a user's body (e.g., forearm) based on the captured image in accordance with various embodiments. The examples illustrated in FIG. 19, in particular, show a scenario in which a user, using the client device 102, scans a physical product (e.g., makeup palette) using a camera provided by the client device 102. The client device 102 (or the product catalog system 124) then performs a recognition process on the captured image(s) to provide additional information in an interface, which includes graphical items, some of which are selectable by the user to perform additional operations or provide additional functionality with respect to media content and tasks that can be performed in connection with the product. The example interfaces of FIG. 19 can be provided for display on a client device (e.g., the client device), such as through an interface(s) of the messaging client application 104.

In an embodiment, as mentioned before, the product catalog system 124 can include a library of 3D objects and images (e.g., stored on database 120) which are used for recognition processes. Further, product manufacturers or product vendors can provide such models for storing on the product catalog system 124.

In a first example of FIG. 19, a set of selectable graphical items are selected and presented in a carousel interface (as described before other types of interfaces may be utilized instead) in the interface 1900. A selectable graphical item 1905, corresponding to a particular augment reality content generator for providing augmented reality content for swatching, is illustrated as being selected by the user in this example. In this example, a graphical animation 1902 is provided in an interface 1900 indicating that the user has initiated a recognition process on a physical item 1901 (e.g., beauty product) based on a focal region 1903 of the camera (e.g., the middle or center region of the display screen of the client device 102). The product identification module 704 can perform such a recognition process, and the graphical animation 1902 can be displayed by the augmented reality content generator module 706 on the client device 102. In an embodiment, the user can perform an image capture process using the messaging client application 104 (e.g., using one or more components described in FIG. 7 such as the image data receiving module 702), and have the product in the view of the camera of the client device 102 which sends captured image data to the product identification module 704 executing on the client device 102. In an embodiment, the product identification module 704 can analyze the captured image data to determine product metadata associated with the product recognized from the image data, including using the aforementioned library of 3D objects and images (e.g., stored on database 120) to recognize/identify the product. Alternatively or conjunctively, the captured image(s) can be sent by the product identification module 704 to the product catalog system 124 for analysis and recognition based on the aforementioned library. Upon identification of the product, product metadata, when included in the database 120, can be provided which can indicate a set of colors associated with the product. This information for the set of colors can then be subsequently used for generating augmented reality content as described below.

In an embodiment, the product identification module 704 can forgo identification of the product described above with the product catalog system 124 and instead identify different colors of makeup found in the physical item 1901 using, for example, image data measurements of color as discussed below.

In this example, image data corresponding to the representation of the physical item 1901 includes different sets of colors 1910, 1912, 1914, and 1916, each of which include respective colors of makeup in a circular shaped region. Image processing techniques (as described in detail herein) can be used to identify the sets of colors 1910, 1912, 1914, and 1916, and then determine a corresponding color (or hue) to each of the circular shaped regions. In an embodiment, the identification of aforementioned colors may utilize various image processing or clustering algorithms (e.g., k-means, and the like). In an example, color values can be extracted from each pixel of the image data corresponding to each of the circular shaped regions. In an embodiment, metadata corresponding to coordinates of a pixel in the image data for a particular color value can be generated for including with a message.

For a set of pixels within the same circular shaped region, the respective color values of these pixels can be averaged to determine a mean color value associated with the region. Respective mean color values can be determined for each of the circular regions and subsequently used by a particular augmented reality content generator to generate augmented reality content as described below. Other techniques may be utilized to identify a color value associated with the color values of pixels from a particular circular shaped region. In some embodiments, the identified color value can be based on the predominant color (e.g., based on highest frequency of appearance in the colors values) of the circular shaped region.

In some embodiments, various texture transfer or texture mapping techniques can be utilized for generating augmented reality content based on the circular shaped regions. In this example, texture information can be determined corresponding to each of the circular shaped regions in the image data including the representation of the physical item 1901. The texture information can then be mapped onto a surface (or portion thereof) of a different object identified in the image data by a given augmented reality content generator as discussed below.

Although circular shaped regions are discussed in FIG. 19, it is appreciated that other geometric shapes or polygons (e.g., rectangle, square, hexagon, octagon, etc.) can be analyzed in a similar fashion as discussed herein for identifying colors or texture mapping and still be within the scope of the subject technology. It is appreciated that the aforementioned texture transfer, texture mapping, and the color identification techniques can be used in combination with each other, in various orders of execution, or alone.

In a second example of FIG. 19, an interface 1950 is provided showing augmented reality content based at least in part on the image and object recognition described above, which may be received and displayed by the augmented reality content generator module 706 on the client device 102. As shown, image data, captured by the camera of the client device 102, is displayed on the display screen of the client device 102 as a representation 1960 of a forearm of the user. Based at least in part on the identified colors of the circular shaped regions from the representation of the physical item 1901, the particular augment reality content generator, corresponding to the selectable graphical item 1905, generates augmented reality content 1970 that is rendered for display by the augmented reality content generator module 706 on the client device 102. Alternatively or conjunctively, the particular augment reality content generator uses texture transfer or texture mapping technique(s) for generating the augmented reality content 1970. As shown, augmented reality content 1970 includes respective virtual swatches of colors corresponding to the identified colors (or textures) of the physical item 1901 which are superimposed or mapped on a surface corresponding to the representation 1960 of the forearm of the user. Although the virtual swatches are shown in a substantially vertical arrangement, it is appreciated that other arrangements for the virtual swatches can be provided (e.g., horizontal) depending on a position of the surface for which the virtual swatches are rendered upon. As further shown, each virtual swatch includes additional information indicating the type of color (or makeup property, and the like).

Figure 20:
FIG. 20 is a flowchart illustrating a method to provide selected information and media content in response to scanning a product (e.g., beauty product), according to certain example embodiments.

FIG. 20 is a flowchart illustrating a method 2000 to provide selected information and media content in response to scanning a product (e.g., beauty product), according to certain example embodiments. The method 2000 may be embodied in computer-readable instructions for execution by one or more computer processors such that the operations of the method 2000 may be performed in part or in whole by the messaging client application 104, particularly with respect to respective components of the annotation system 206 described above in FIG. 7; accordingly, the method 2000 is described below by way of example with reference thereto. However, it shall be appreciated that at least some of the operations of the method 2000 may be deployed on various other hardware configurations and the method 2000 is not intended to be limited to the messaging client application 104.

At operation 2002, the image data receiving module 702 receives image data including a representation of a physical item. In an example, the physical item is a beauty product At operation 2004, the product identification module 704 analyzes the image data to determine an object corresponding to the physical item. In an embodiment, analyzing the image data to determine an object corresponding to the physical item further includes performing an object recognition algorithm to identify the object.

In an embodiment, the product identification module 704 analyzes an identification indicator of the physical item, determines whether the identification indicator of the physical item includes a representation of a barcode, and in response to determining that the identification indicator of the physical item includes the representation of the barcode, extracts product metadata from the representation of the barcode. In an embodiment, determining whether the identification indicator of the physical item includes the representation of the barcode includes performing a recognition operation to recognize the representation of the barcode associated with the physical item. The identification indicator further includes a representation of a Universal Product Code (UPC) corresponding to the physical item in an example.

At operation 2006, the product identification module 704 extracts product metadata based on the determined object. In an embodiment, extracting the product metadata based on the determined object further includes comparing the identified object to a library of objects, each object from the library of objects including associated metadata with product information corresponding to a product, determining that the identified object matches a particular object from the library of object based at least in part on a confidence score being above a threshold value, and providing the associated metadata of the particular object.

At operation 2008, the product identification module 704 sends, to a server, the product metadata to determine second product metadata associated with the product metadata. The second product metadata includes media content from an external source, the external source being different than a messaging platform utilized by the client device.

At operation 2010, the product identification module 704 receives, from the server, the second product metadata, the second product metadata including additional information related to the physical item.

At operation 2012, the augmented reality content generator module 706 causes display, at a client device, the additional information related to the physical item based at least in part on the second product metadata. The additional information includes information related to a set of similar products to the beauty product and a list of ingredients associated with the beauty product. Further, the augmented reality content generator module 706 causes display, at the client device, a selectable graphical item to purchase the beauty product.

Figure 21:
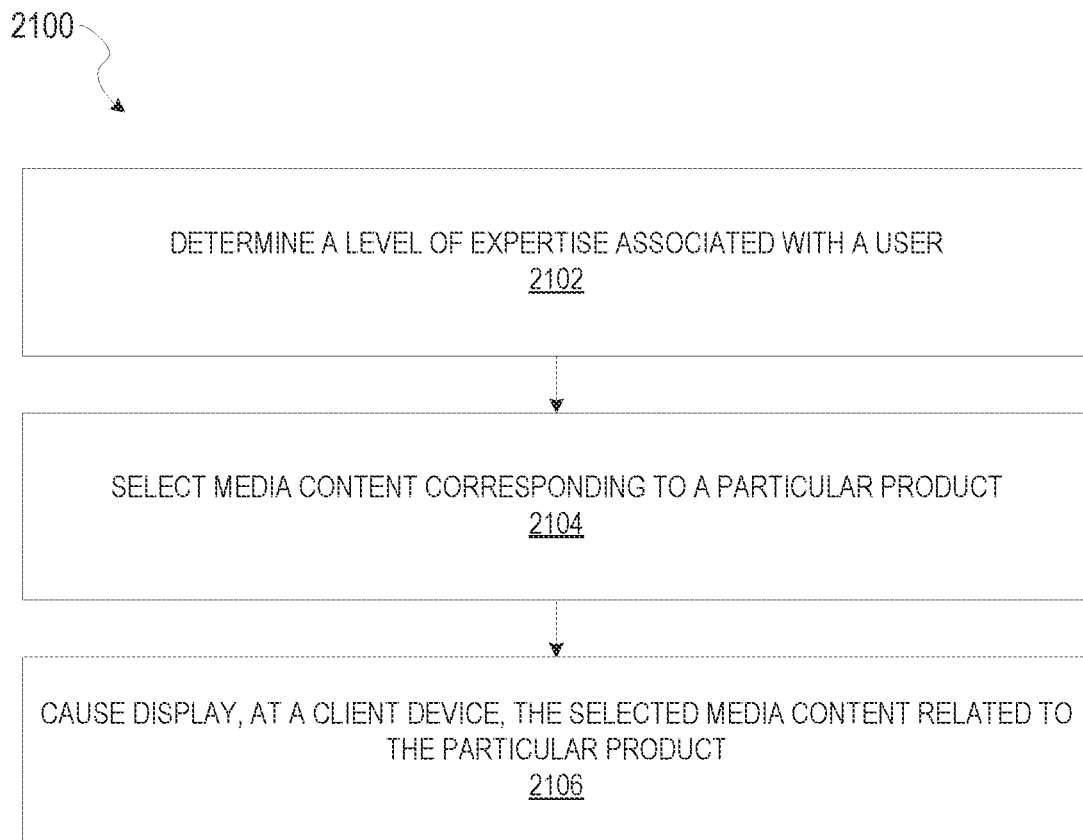
FIG. 21 is a flowchart illustrating a method to provide selected information and media content based on profile information of a user, according to certain example embodiments.

FIG. 21 is a flowchart illustrating a method 2100 to provide selected information and media content based on profile information of a user, according to certain example embodiments. The method 2100 may be embodied in computer-readable instructions for execution by one or more computer processors such that the operations of the method 2100 may be performed in part or in whole by the messaging client application 104, particularly with respect to respective components of the annotation system 206 described above in FIG. 7; accordingly, the method 2100 is described below by way of example with reference thereto. However, it shall be appreciated that at least some of the operations of the method 2100 may be deployed on various other hardware configurations and the method 2100 is not intended to be limited to the messaging client application 104.

At operation 2102, the product identification module 704 determines a level of expertise associated with a user of a messaging system, the level of expertise based at least in part on user activity in a particular product category. The level of expertise corresponds to a particular product segment in an example. Moreover, the level of expertise can be associated with a persona.

In an embodiment, determining the level of expertise associated with the user is based on profile information associated with the user. The profile information is based on historical information of activity of the user.

In an embodiment, determining the level of expertise associated with the user of a messaging system includes determining a sum of a set of score values associated with user activity of the user. Based on the sum, a particular level is determined, among a plurality of different levels, to associate with the user, the particular level corresponding to the level of expertise.

At operation 2104, the product identification module 704, based at least in part on the determined level of expertise, selects media content corresponding to a particular product.

In an embodiment, selecting the media content corresponding to the particular product includes identifying a set of media content based at least in part on the historical information of activity of the user, determining a respective indicator of an associated level of expertise for each of the set of media content, and selecting particular media content from the set of media content with the associated level of expertise that corresponds with the level of expertise. The selected particular media comprises at least one video or augmented reality content generator. The selected media content is provided by an external source separate from the client device and a messaging system.

At operation 2106, the product identification module 704 causes display, at a client device, the selected media content related to the particular product. Further, in an interface, a selection of particular media content from the selected media content is received, which can cause play back or access of the particular media content.

Figure 22:
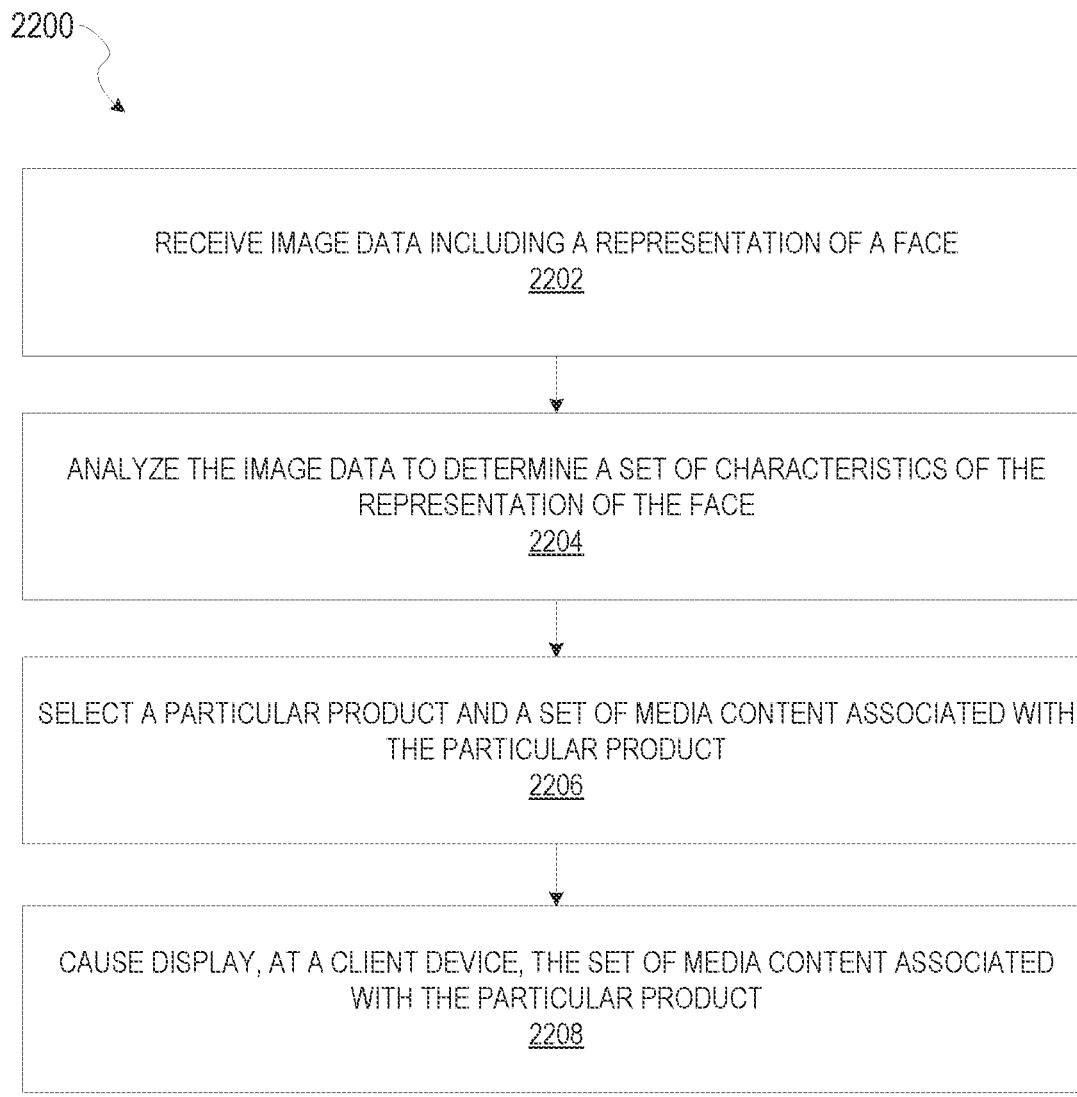
FIG. 22 is a flowchart illustrating a method to provide a recommendation based on analyzing facial features a user's face, according to certain example embodiments.

FIG. 22 is a flowchart illustrating a method 2200 to provide a recommendation based on analyzing facial features a user's face, according to certain example embodiments. The method 2200 may be embodied in computer-readable instructions for execution by one or more computer processors such that the operations of the method 2200 may be performed in part or in whole by the messaging client application 104, particularly with respect to respective components of the annotation system 206 described above in FIG. 7; accordingly, the method 2200 is described below by way of example with reference thereto. However, it shall be appreciated that at least some of the operations of the method 2200 may be deployed on various other hardware configurations and the method 2200 is not intended to be limited to the messaging client application 104.

At operation 2202, the image data receiving module 702 receives image data including a representation of a face of a user. In an example, the image data is captured by a front-facing camera of the client device 102.

At operation 2204, the product identification module 704 analyzes the image data to determine a set of characteristics of the representation of the face. In an example, the determined set of characteristics includes a health-related characteristic identified in the representation of the face. In another example, the determined set of characteristics includes a shape of the face, or a skin tone of the face.

In an embodiment, analyzing the image data to determine the set of characteristics of the representation of the face includes performing a facial feature detection process to detect a first facial feature, and identifying a health-related characteristic associated with the detected first facial feature. In an example, the facial feature detection process corresponds to a machine learning algorithm. In another example, the machine learning algorithm is based on a neural network model. Further, a second facial feature detection process can be performed to detect the first facial feature, where the second facial feature detection process being different than the facial feature detection process.

In an embodiment, analyzing the image data is based on a selected portion of the representation of the face.

At operation 2206, the product identification module 704, based at least in part on the determined set of characteristics, selects a particular product and a set of media content associated with the particular product.

In an embodiment, selecting the particular product and the set of media content further includes searching a product table to identify at least one product related to the determined set of characteristics, the at least one product comprising a product that, when utilized, addresses a facial condition included in the determined set of characteristics.

At operation 2208, the augmented reality content generator module 706 causes display, at a client device, at least one recommendation corresponding to the set of media content associated with the particular product. In an example, the at least one recommendation corresponds to a suggested augmented content reality generator, media content, or additional textual information related to at least one characteristic from the determined set of characteristics.

Figure 23:
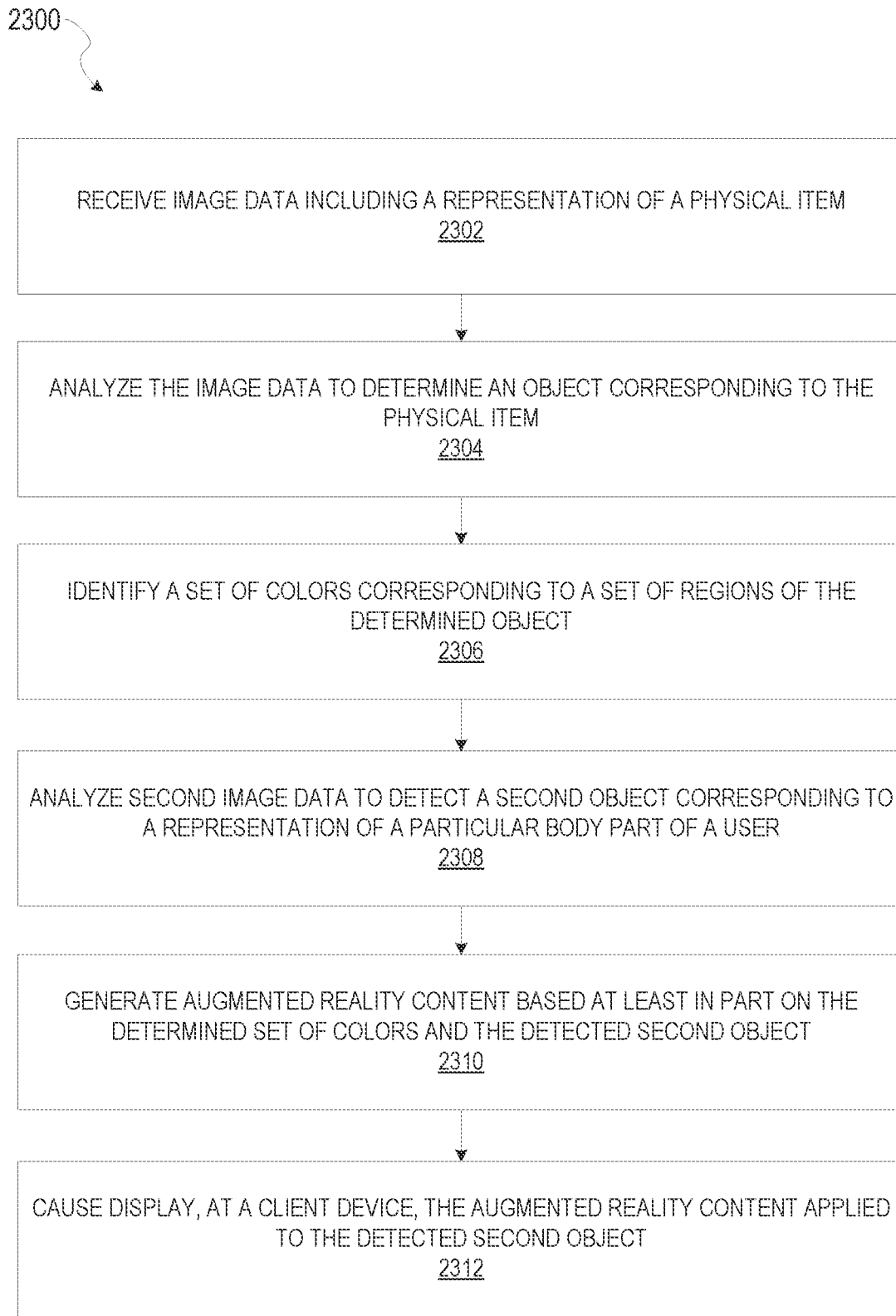
FIG. 23 is a flowchart illustrating a method to provide augmented reality content corresponding to swatching based on a particular beauty product (e.g., makeup palette), according to certain example embodiments.

FIG. 23 is a flowchart illustrating a method 2300 to provide augmented reality content corresponding to swatching based on a particular beauty product (e.g., makeup palette), according to certain example embodiments. The method 2300 may be embodied in computer-readable instructions for execution by one or more computer processors such that the operations of the method 2300 may be performed in part or in whole by the messaging client application 104, particularly with respect to respective components of the annotation system 206 described above in FIG. 7; accordingly, the method 2300 is described below by way of example with reference thereto. However, it shall be appreciated that at least some of the operations of the method 2300 may be deployed on various other hardware configurations and the method 2300 is not intended to be limited to the messaging client application 104.

At operation 2302, the image data receiving module 702 receives image data including a representation of a physical item. In an example, the physical item corresponds to a beauty product, the beauty product corresponding to a makeup palette.

At operation 2304, the product identification module 704 analyzes the image data to determine an object corresponding to the physical item.

At operation 2306, the product identification module 704 identifies a set of colors corresponding to a set of regions of the determined object. In an example, the identified set of colors corresponds to a second set of colors included in a portion of the image data including the set of regions of the determined object. Each region of the set of region is associated with a particular color.

In an embodiment, identifying the set of colors further includes determining a set of colors values of pixels in a particular region from the set of regions of the determined object, determining a representative color value based on an average of the set of colors.

In an embodiment, a set of textures is determined based on pixels from the set of regions of the determined object.

At operation 2308, the product identification module 704 analyzes second image data to detect a second object corresponding to a representation of a particular body part of a user. In an example, the particular body part of the user comprises a forearm.

In an embodiment, analyzing the second image data further includes performing a body feature detection process to detect a first body feature, and identifying a particular body part corresponding to the detected first body feature.

At operation 2310, the augmented reality content generator module 706 generates augmented reality content based at least in part on the identified set of colors and the detected second object.

In an embodiment, generating the augmented reality content further includes generating a shape based on the representative color value, and mapping the shape to a surface of the second object corresponding to the representation of the particular body part.

In an embodiment, generating the augmented reality content further includes performing a texture transfer process based on the set of textures to a surface of the second object corresponding to the representation of the particular body part.

At operation 2312, the augmented reality content generator module 706 causes display, at a client device, the augmented reality content applied to the detected second object.

Figure 24:
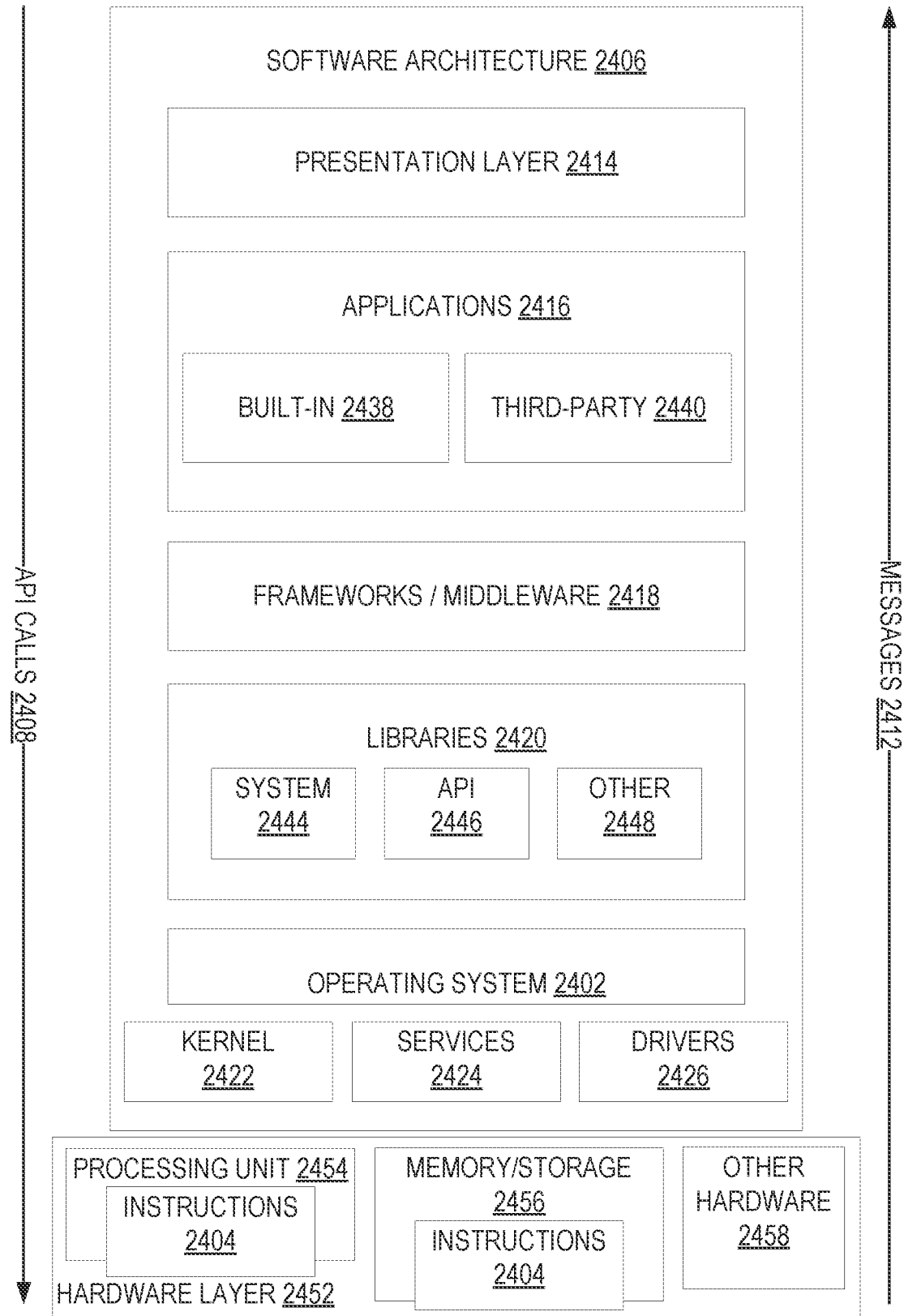
FIG. 24 is block diagram showing a software architecture within which the present disclosure may be implemented, in accordance with some example embodiments.

FIG. 24 is a block diagram illustrating an example software architecture 2406, which may be used in conjunction with various hardware architectures herein described. FIG. 24 is a non-limiting example of a software architecture and it will be appreciated that many other architectures may be implemented to facilitate the functionality described herein. The software architecture 2406 may execute on hardware such as machine 2500 of FIG. 25 that includes, among other things, processors 2504, memory 2514, and (input/output) I/O components 2518. A representative hardware layer 2452 is illustrated and can represent, for example, the machine 2500 of FIG. 25. The representative hardware layer 2452 includes a processing unit 2454 having associated executable instructions 2404. Executable instructions 2404 represent the executable instructions of the software architecture 2406, including implementation of the methods, components, and so forth described herein. The hardware layer 2452 also includes memory or storage modules memory/storage 2456, which also have executable instructions 2404. The hardware layer 2452 may also comprise other hardware 2458.

In the example architecture of FIG. 24, the software architecture 2406 may be conceptualized as a stack of layers where each layer provides particular functionality. For example, the software architecture 2406 may include layers such as an operating system 2402, libraries 2420, frameworks/middleware 2418, applications 2416, and a presentation layer 2414. Operationally, the applications 2416 or other components within the layers may invoke API calls 2408 through the software stack and receive a response as in messages 2412 to the API calls 2408. The layers illustrated are representative in nature and not all software architectures have all layers. For example, some mobile or special purpose operating systems may not provide a frameworks/middleware 2418, while others may provide such a layer. Other software architectures may include additional or different layers.

The operating system 2402 may manage hardware resources and provide common services. The operating system 2402 may include, for example, a kernel 2422, services 2424, and drivers 2426. The kernel 2422 may act as an abstraction layer between the hardware and the other software layers. For example, the kernel 2422 may be responsible for memory management, processor management (e.g., scheduling), component management, networking, security settings, and so on. The services 2424 may provide other common services for the other software layers. The drivers 2426 are responsible for controlling or interfacing with the underlying hardware. For instance, the drivers 2426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2420 provide a common infrastructure that is used by the applications 2416 or other components or layers. The libraries 2420 provide functionality that allows other software components to perform tasks in an easier fashion than to interface directly with the underlying operating system 2402 functionality (e.g., kernel 2422, services 2424 or drivers 2426). The libraries 2420 may include system libraries 2444 (e.g., C standard library) that may provide functions such as memory allocation functions, string manipulation functions, mathematical functions, and the like. In addition, the libraries 2420 may include API libraries 2446 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2420 may also include a wide variety of other libraries 2448 to provide many other APIs to the applications 2416 and other software components/modules.

The frameworks/middleware 2418 (also sometimes referred to as middleware) provide a higher-level common infrastructure that may be used by the applications 2416 or other software components/modules. For example, the frameworks/middleware 2418 may provide various graphic user interface (GUI) functions, high-level resource management, high-level location services, and so forth. The frameworks/middleware 2418 may provide a broad spectrum of other APIs that may be used by the applications 2416 or other software components/modules, some of which may be specific to a particular operating system 2402 or platform.

The applications 2416 include built-in applications 2438 or third-party applications 2440. Examples of representative built-in applications 2438 may include, but are not limited to, a contacts application, a browser application, a book reader application, a location application, a media application, a messaging application, or a game application. Third-party applications 2440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 2440 may invoke the API calls 2408 provided by the mobile operating system (such as operating system 2402) to facilitate functionality described herein.

The applications 2416 may use built in operating system functions (e.g., kernel 2422, services 2424 or drivers 2426), libraries 2420, and frameworks/middleware 2418 to create user interfaces to interact with users of the system. Alternatively, or additionally, in some systems interactions with a user may occur through a presentation layer, such as presentation layer 2414. In these systems, the application/component 'logic' can be separated from the aspects of the application/component that interact with a user.

Figure 25:
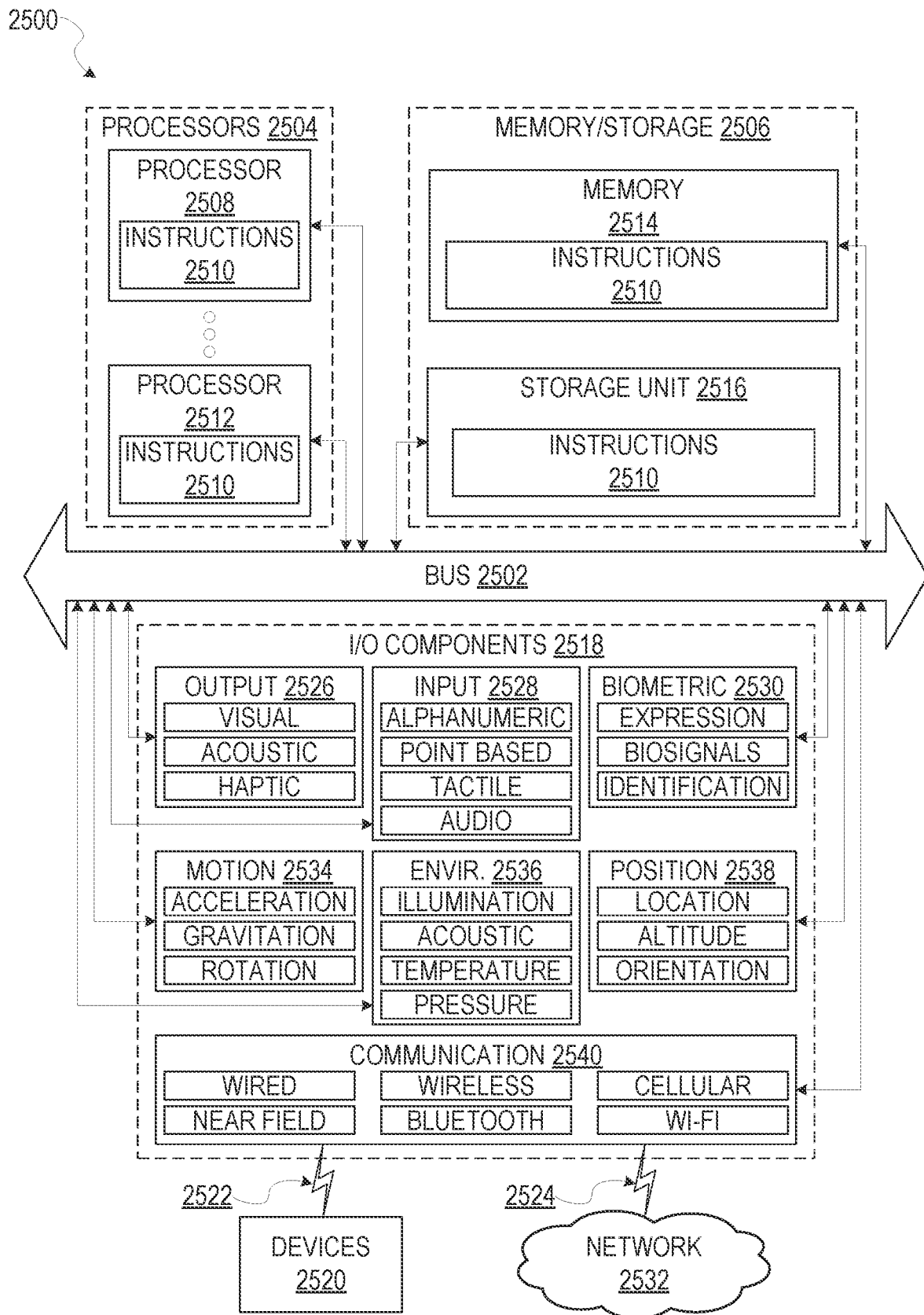
FIG. 25 is a diagrammatic representation of a machine, in the form of a computer system within which a set of instructions may be executed for causing the machine to perform any one or more of the methodologies discussed, in accordance with some example embodiments.

FIG. 25 is a block diagram illustrating components of a machine 2500, according to some example embodiments, able to read instructions from a machine-readable medium (e.g., a machine-readable storage medium) and perform any one or more of the methodologies discussed herein. Specifically, FIG. 25 shows a diagrammatic representation of the machine 2500 in the example form of a computer system, within which instructions 2510 (e.g., software, a program, an application, an applet, an app, or other executable code) for causing the machine 2500 to perform any one or more of the methodologies discussed herein may be executed. As such, the instructions 2510 may be used to implement modules or components described herein. The instructions 2510 transform the general, non-programmed machine 2500 into a particular machine 2500 programmed to carry out the described and illustrated functions in the manner described. In alternative embodiments, the machine 2500 operates as a standalone device or may be coupled (e.g., networked) to other machines. In a networked deployment, the machine 2500 may operate in the capacity of a server machine or a client machine in a server-client network environment, or as a peer machine in a peer-to-peer (or distributed) network environment. The machine 2500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2510, sequentially or otherwise, that specify actions to be taken by machine 2500. Further, while only a single machine 2500 is illustrated, the term 'machine' shall also be taken to include a collection of machines that individually or jointly execute the instructions 2510 to perform any one or more of the methodologies discussed herein.

The machine 2500 may include processors 2504, including processor 2508 to processor 2512, memory/storage 2506, and I/O components 2518, which may be configured to communicate with each other such as via a bus 2502. The memory/storage 2506 may include a memory 2514, such as a main memory, or other memory storage, and a storage unit 2516, both accessible to the processors 2504 such as via the bus 2502. The storage unit 2516 and memory 2514 store the instructions 2510 embodying any one or more of the methodologies or functions described herein. The instructions 2510 may also reside, completely or partially, within the memory 2514, within the storage unit 2516, within at least one of the processors 2504 (e.g., within the processor's cache memory), or any suitable combination thereof, during execution thereof by the machine 2500. Accordingly, the memory 2514, the storage unit 2516, and the memory of processors 2504 are examples of machine-readable media.

The I/O components 2518 may include a wide variety of components to receive input, provide output, produce output, transmit information, exchange information, capture measurements, and so on. The specific I/O components 2518 that are included in a particular machine 2500 will depend on the type of machine. For example, portable machines such as mobile phones will likely include a touch input device or other such input mechanisms, while a headless server machine will likely not include such a touch input device. It will be appreciated that the I/O components 2518 may include many other components that are not shown in FIG. 25. The I/O components 2518 are grouped according to functionality merely for simplifying the following discussion and the grouping is in no way limiting. In various example embodiments, the I/O components 2518 may include output components 2526 and input components 2528. The output components 2526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example embodiments, the I/O components 2518 may include biometric components 2530, motion components 2534, environmental components 2536, or position components 2538 among a wide array of other components. For example, the biometric components 2530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2534 may include acceleration sensor components (e.g., accelerometer), gravitation sensor components, rotation sensor components (e.g., gyroscope), and so forth. The environmental components 2536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2518 may include communication components 2540 operable to couple the machine 2500 to a network 2532 or devices 2520 via coupling 2524 and coupling 2522, respectively. For example, the communication components 2540 may include a network interface component or other suitable device to interface with the network 2532. In further examples, communication components 2540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2520 may be another machine or any of a wide variety of peripheral devices (e.g., a peripheral device coupled via a USB).

Moreover, the communication components 2540 may detect identifiers or include components operable to detect identifiers. For example, the communication components 2540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2540, such as, location via Internet Protocol (IP) geo-location, location via Wi-Fi® signal triangulation, location via detecting a NFC beacon signal that may indicate a particular location, and so forth.

The following discussion relates to various terms or phrases that are mentioned throughout the subject disclosure.

'Signal Medium' refers to any intangible medium that is capable of storing, encoding, or carrying the instructions for execution by a machine and includes digital or analog communications signals or other intangible media to facilitate communication of software or data. The term 'signal medium' shall be taken to include any form of a modulated data signal, carrier wave, and so forth. The term 'modulated data signal' means a signal that has one or more of its characteristics set or changed in such a matter as to encode information in the signal. The terms 'transmission medium' and 'signal medium' mean the same thing and may be used interchangeably in this disclosure.

'Communication Network' refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

'Processor' refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as 'cores') that may execute instructions contemporaneously.

'Machine-Storage Medium' refers to a single or multiple storage devices or media (e.g., a centralized or distributed database, or associated caches and servers) that store executable instructions, routines or data. The term shall accordingly be taken to include, but not be limited to, solid-state memories, and optical and magnetic media, including memory internal or external to processors. Specific examples of machine-storage media, computer-storage media or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms 'machine-storage medium,' 'device-storage medium,' 'computer-storage medium' mean the same thing and may be used interchangeably in this disclosure. The terms 'machine-storage media,' 'computer-storage media,' and 'device-storage media' specifically exclude carrier waves, modulated data signals, and other such media, at least some of which are covered under the term 'signal medium.'

'Component' refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A 'hardware component' is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase 'hardware component' (or 'hardware-implemented component') should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, 'processor-implemented component' refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

'Carrier Signal' refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

'Computer-Readable Medium' refers to both machine-storage media and transmission media. Thus, the terms include both storage devices/media and carrier waves/modulated data signals. The terms 'machine-readable medium,' 'computer-readable medium' and 'device-readable medium' mean the same thing and may be used interchangeably in this disclosure.

'Client Device' refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network. In the subject disclosure, a client device is also referred to as an 'electronic device.'

'Ephemeral Message' refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

'Signal Medium' refers to any intangible medium that is capable of storing, encoding, or carrying the instructions for execution by a machine and includes digital or analog communications signals or other intangible media to facilitate communication of software or data. The term 'signal medium' shall be taken to include any form of a modulated data signal, carrier wave, and so forth. The term 'modulated data signal' means a signal that has one or more of its characteristics set or changed in such a matter as to encode information in the signal. The terms 'transmission medium' and 'signal medium' mean the same thing and may be used interchangeably in this disclosure.

'Communication Network' refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

'Processor' refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as 'cores') that may execute instructions contemporaneously.

'Machine-Storage Medium' refers to a single or multiple storage devices or media (e.g., a centralized or distributed database, or associated caches and servers) that store executable instructions, routines or data. The term shall accordingly be taken to include, but not be limited to, solid-state memories, and optical and magnetic media, including memory internal or external to processors. Specific examples of machine-storage media, computer-storage media or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms 'machine-storage medium,' 'device-storage medium,' 'computer-storage medium' mean the same thing and may be used interchangeably in this disclosure. The terms 'machine-storage media,' 'computer-storage media,' and 'device-storage media' specifically exclude carrier waves, modulated data signals, and other such media, at least some of which are covered under the term 'signal medium.'

'Component' refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A 'hardware component' is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase 'hardware component' (or 'hardware-implemented component') should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, 'processor-implemented component' refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

'Carrier Signal' refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

'Computer-Readable Medium' refers to both machine-storage media and transmission media. Thus, the terms include both storage devices/media and carrier waves/modulated data signals. The terms 'machine-readable medium,'

'computer-readable medium' and 'device-readable medium' mean the same thing and may be used interchangeably in this disclosure.

'Client Device' refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

'Ephemeral Message' refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

What is claimed is:

1. A method, comprising:
receiving, by an image data receiving module of a client device, image data including a representation of a face of a user;
receiving a first selection of a portion of the representation of the face of the user;
in response to the first selection of the portion of the representation of the face of the user, causing display of a plurality of selectable graphical items, each of the plurality of selectable graphical items corresponding to a particular state of the portion of the representation of the face of the user;
receiving a second selection of a particular selectable graphical item from the plurality of selectable graphical items;
analyzing, by a product identification module accessing a shared memory of the client device, the image data to determine a set of characteristics of the representation of the face;
based at least in part on the determined set of characteristics and the second selection of the particular selectable graphical item from the plurality of selectable graphical items, selecting a product and a set of media content associated with the product, the product comprising a particular product that, when utilized, addresses a facial condition included in the determined set of characteristics, wherein selecting the product and the set of media content comprises:
sending, by the client device to a product catalog system over the Internet, an indicator of the selected product, the product catalog system comprising a first processor for processing product metadata and a first memory for storing information related to second product metadata associated with the product metadata of the selected product, the information comprising at least a set of manufacturers of the selected product;
sending, by the product catalog system, a request message over the Internet to a product catalog service system for obtaining metadata related to a respective physical item associated with the selected product, the request message including a product identifier, and the product catalog system and the product catalog service system being different systems that are communicatively coupled over the Internet;
performing, by the product catalog service system, a query on a database over a network based on the product identifier in the request message for information related to the respective physical item:
in response to the request message, providing, by the product catalog service system, a response message to the product catalog system, the response message including the second product metadata based on the information related to the respective physical item from the database over the network:
receiving, by the client device from the product catalog system over the Internet, the second product metadata, the second product metadata including additional information related to the selected product, the additional information comprising information that the selected product addresses the facial condition; and
causing display, at the client device, of at least one recommendation corresponding to the set of media content associated with the product, the at least one recommendation facilitating identifying a set of products, including the product, that address at least one health condition, corresponding to the facial condition, through using the set of products by the user.

2. The method of claim 1,
wherein the product metadata comprises the product identifier, a product augmented reality experience identifier, and information related to the product corresponding to the product identifier:
wherein selecting the product and the set of media content further comprises:
performing, by the product catalog system, a lookup operation on a product table to retrieve the product metadata; and
storing, by the product catalog system, the information related to the respective physical item into the product table.

3. The method of claim 1, wherein the at least one recommendation comprises a suggested augmented content reality generator, media content, or additional textual information related to at least one characteristic from the determined set of characteristics.

4. The method of claim 1, wherein the determined set of characteristics includes a health-related characteristic identified in the representation of the face, and the health condition comprises at least one of dry skin, oily skin, combination skin, sunburns, acne, eczema, rosacea, ichthyosis, or dermatitis.

5. The method of claim 1, wherein the determined set of characteristics includes a shape of the face, or a skin tone of the face.

6. The method of claim 1, wherein analyzing the image data to determine the set of characteristics of the representation of the face further comprises:
performing a facial feature detection process to detect a first facial feature; and
identifying a health-related characteristic associated with the detected first facial feature.

7. The method of claim 6, wherein the facial feature detection process comprises a machine learning algorithm.

8. The method of claim 7, wherein the machine learning algorithm is based on a neural network model.

9. The method of claim 6, further comprising:
performing a second facial feature detection process to detect the first facial feature, the second facial feature detection process being different than the facial feature detection process.

10. The method of claim 1, wherein first selection of the portion of the representation of the face of the user corresponds to an eye of the face of the user, and wherein the determined set of characteristics comprises different types of eyelashes, the different type of eyelashes comprising dry eyelashes and weak eyelashes,
wherein the at least one recommendation comprises textual information related to addressing dry eyelashes.

11. A system comprising:
a processor; and
a memory including instructions that, when executed by the processor, cause the processor to perform operations comprising:
receiving, by an image data receiving module of a client device, image data including a representation of a face of a user;
receiving a first selection of a portion of the representation of the face of the user;
in response to the first selection of the portion of the representation of the face of the user, causing display of a plurality of selectable graphical items, each of the plurality of selectable graphical items corresponding to a particular state of the portion of the representation of the face of the user;
receiving a second selection of a particular selectable graphical item from the plurality of selectable graphical items;
analyzing, by a product identification module accessing a shared memory of the client device, the image data to determine a set of characteristics of the representation of the face;
based at least in part on the determined set of characteristics and the second selection of the particular selectable graphical item from the plurality of selectable graphical items, selecting a product and a set of media content associated with the product, the product comprising a particular product that, when utilized, addresses a facial condition included in the determined set of characteristics, wherein selecting the product and the set of media content comprises:
sending, by the client device to a product catalog system over the Internet, an indicator of the selected product, the product catalog system comprising a first processor for processing product metadata and a first memory for storing information related to second product metadata associated with the product metadata of the selected product, the information comprising at least a set of manufacturers of the selected product;
sending, by the product catalog system, a request message over the Internet to a product catalog service system for obtaining metadata related to a respective physical item associated with the selected product, the request message including a product identifier, and the product catalog system and the product catalog service system being different systems that are communicatively coupled over the Internet:
performing, by the product catalog service system, a query on a database over a network based on the product identifier in the request message for information related to the respective physical item:
in response to the request message, providing, by the product catalog service system, a response message to the product catalog system, the response message including the second product metadata based on the information related to the respective physical item from the database over the network:
receiving, by the client device from the product catalog system over the Internet, the second product metadata, the second product metadata including additional information related to the selected product, the additional information comprising information that the selected product addresses the facial condition; and
causing display, at the client device, of at least one recommendation corresponding to the set of media content associated with the product, the at least one recommendation facilitating identifying a set of products, including the product, that address at least one health condition, corresponding to the facial condition, through using the set of products by the user.

12. The system of claim 11,
wherein the product metadata comprises the product identifier, a product augmented reality experience identifier, and information related to the product corresponding to the product identifier:
performing, by the product catalog system, a lookup operation on a product table to retrieve product metadata; and
storing, by the product catalog system, the information related to the respective physical item into the product table.

13. The system of claim 11, wherein the at least one recommendation comprises a suggested augmented content reality generator, media content, or additional textual information related to at least one characteristic from the determined set of characteristics.

14. The system of claim 11, wherein the determined set of characteristics includes a health-related characteristic identified in the representation of the face.

15. The system of claim 11, wherein the determined set of characteristics includes a shape of the face, or a skin tone of the face.

16. The system of claim 11, wherein analyzing the image data to determine the set of characteristics of the representation of the face further causes the processor to perform further operations comprising:
performing a facial feature detection process to detect a first facial feature; and
identifying a health-related characteristic associated with the detected first facial feature.

17. The system of claim 16, wherein the facial feature detection process comprises a machine learning algorithm.

18. The system of claim 17, wherein the machine learning algorithm is based on a neural network model.

19. The system of claim 16, wherein the memory includes further instructions, which further cause the processor to perform further operations comprising:
performing a second facial feature detection process to detect the first facial feature, the second facial feature detection process being different than the facial feature detection process.

20. A non-transitory computer-readable medium comprising instructions,
which when executed by a computing device, cause the computing device to perform operations comprising:
receiving, by an image data receiving module of a client device, image data including a representation of a face of a user;
receiving a first selection of a portion of the representation of the face of the user;
in response to the first selection of the portion of the representation of the face of the user, causing display of a plurality of selectable graphical items, each of the plurality of selectable graphical items corresponding to a particular state of the portion of the representation of the face of the user;

receiving a second selection of a particular selectable graphical item from the plurality of selectable graphical items;

analyzing, by a product identification module accessing a shared memory of the client device, the image data to determine a set of characteristics of the representation of the face;

based at least in part on the determined set of characteristics and the second selection of the particular selectable graphical item from the plurality of selectable graphical items, selecting a product and a set of media content associated with the product, the product comprising a particular product that, when utilized, addresses a facial condition included in the determined set of characteristics, wherein selecting the product and the set of media content comprises:

sending, by the client device to a product catalog system over the Internet, an indicator of the selected product, the product catalog system comprising a first processor for processing product metadata and a first memory for storing information related to second product metadata associated with the product metadata of the selected product, the information comprising at least a set of manufacturers of the selected product;

sending, by the product catalog system, a request message over the Internet to a product catalog service system for obtaining metadata related to a respective physical item associated with the selected product, the request message including a product identifier, and the product catalog system and the product catalog service system being different systems that are communicatively coupled over the Internet:

performing, by the product catalog service system, a query on a database over a network based on the product identifier in the request message for information related to the respective physical item:

in response to the request message, providing, by the product catalog service system, a response message to the product catalog system, the response message including the second product metadata based on the information related to the respective physical item from the database over the network;

receiving, by the client device from the product catalog system over the Internet, the second product metadata, the second product metadata including additional information related to the selected product, the additional information comprising information that the selected product addresses the facial condition; and causing display, at the client device, of at least one recommendation corresponding to the set of media content associated with the product, the at least one recommendation facilitating identifying a set of products, including the product, that address at least one health condition, corresponding to the facial condition, through using the set of products by the user.

* * * * *